United States Patent
Ogata et al.

(10) Patent No.: US 9,513,720 B2
(45) Date of Patent: Dec. 6, 2016

(54) STYLUS DETECTING DEVICE AND STYLUS DETECTING METHOD

(71) Applicant: PANASONIC INTELLECTUAL PROPERTY CORPORATION OF AMERICA, Torrance, CA (US)

(72) Inventors: Shinsuke Ogata, Osaka (JP); Akihiro Miyazaki, Osaka (JP); Takeshi Shimamoto, Osaka (JP); Tomoo Kimura, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 42 days.

(21) Appl. No.: 14/353,402

(22) PCT Filed: Aug. 21, 2013

(86) PCT No.: PCT/JP2013/004934
§ 371 (c)(1),
(2) Date: Apr. 22, 2014

(87) PCT Pub. No.: WO2014/034049
PCT Pub. Date: Mar. 6, 2014

(65) Prior Publication Data
US 2014/0285475 A1 Sep. 25, 2014

(30) Foreign Application Priority Data
Aug. 30, 2012 (JP) ................................. 2012-190453

(51) Int. Cl.
*G06F 3/0354* (2013.01)
*G06F 3/042* (2006.01)
(Continued)

(52) U.S. Cl.
CPC ......... *G06F 3/03545* (2013.01); *G01B 11/002* (2013.01); *G01B 11/26* (2013.01);
(Continued)

(58) Field of Classification Search
None
See application file for complete search history.

(56) References Cited

U.S. PATENT DOCUMENTS

| 5,557,301 A | 9/1996 | D'Aviau de Piolant |
| 6,512,507 B1 | 1/2003 | Furihata et al. |

(Continued)

FOREIGN PATENT DOCUMENTS

| JP | 5-127810 | 5/1993 |
| JP | 5-92844 | 12/1993 |

(Continued)

OTHER PUBLICATIONS

International Search Report issued Nov. 5, 2013 in International Application No. PCT/JP2013/004934.

*Primary Examiner* — Jason Olson
*Assistant Examiner* — Krishna Neupane
(74) *Attorney, Agent, or Firm* — Wenderoth, Lind & Ponack, L.L.P.

(57) ABSTRACT

A stylus detecting device detects a pointed position which is a position pointed to by a stylus, and includes a first camera; a second camera; and a control unit including an axis detecting unit that detects a three-dimensional position and attitude of an axis of the stylus by using two images captured respectively by the first and second cameras, and a pointed position detecting unit that calculates as the pointed position a point of intersection between a straight line indicated by the axis of the stylus whose three-dimensional position and attitude have been detected by the axis detecting unit and a
(Continued)

target plane having a predetermined positional relationship with respect to the first and second cameras.

21 Claims, 17 Drawing Sheets

(51) Int. Cl.
| | | |
|---|---|---|
| G01B 11/26 | (2006.01) | |
| G06F 3/041 | (2006.01) | |
| G06F 3/0346 | (2013.01) | |
| G01B 11/00 | (2006.01) | |
| G06T 7/00 | (2006.01) | |
| G06F 3/048 | (2013.01) | |

(52) U.S. Cl.
CPC ............ *G06F 3/0346* (2013.01); *G06F 3/041* (2013.01); *G06F 3/048* (2013.01); *G06F 3/0425* (2013.01); *G06T 7/004* (2013.01); *G06T 2207/10012* (2013.01)

(56) References Cited

U.S. PATENT DOCUMENTS

| | | | |
|---|---|---|---|
| 6,531,999 B1* | 3/2003 | Trajkovic | G06F 3/0304 345/157 |
| 7,499,514 B2 | 3/2009 | Harada et al. | |
| 8,378,970 B2 | 2/2013 | Nishida et al. | |
| 2005/0271176 A1 | 12/2005 | Harada et al. | |
| 2009/0102788 A1 | 4/2009 | Nishida et al. | |
| 2011/0267265 A1* | 11/2011 | Stinson | G06F 3/0304 345/157 |
| 2013/0070232 A1* | 3/2013 | Izukawa | G06F 3/0304 356/51 |
| 2013/0162535 A1 | 6/2013 | Nishida et al. | |

FOREIGN PATENT DOCUMENTS

| | | |
|---|---|---|
| JP | 6-149468 | 5/1994 |
| JP | 6-507988 | 9/1994 |
| JP | 7-44313 | 2/1995 |
| JP | 8-95707 | 4/1996 |
| JP | 8-171446 | 7/1996 |
| JP | 11-345086 | 12/1999 |
| JP | 11-345087 | 12/1999 |
| JP | 2000-276297 | 10/2000 |
| JP | 2001-5609 | 1/2001 |
| JP | 3520823 | 4/2004 |
| JP | 2005-267169 | 9/2005 |
| JP | 2005-354190 | 12/2005 |
| JP | 2009-104297 | 5/2009 |
| JP | 2009-151516 | 7/2009 |
| JP | 2010-28635 | 2/2010 |
| JP | 2011-24284 | 2/2011 |
| JP | 2011-84050 | 4/2011 |
| JP | 2011-118523 | 6/2011 |
| JP | 4708278 | 6/2011 |
| JP | 2011-180690 | 9/2011 |

* cited by examiner

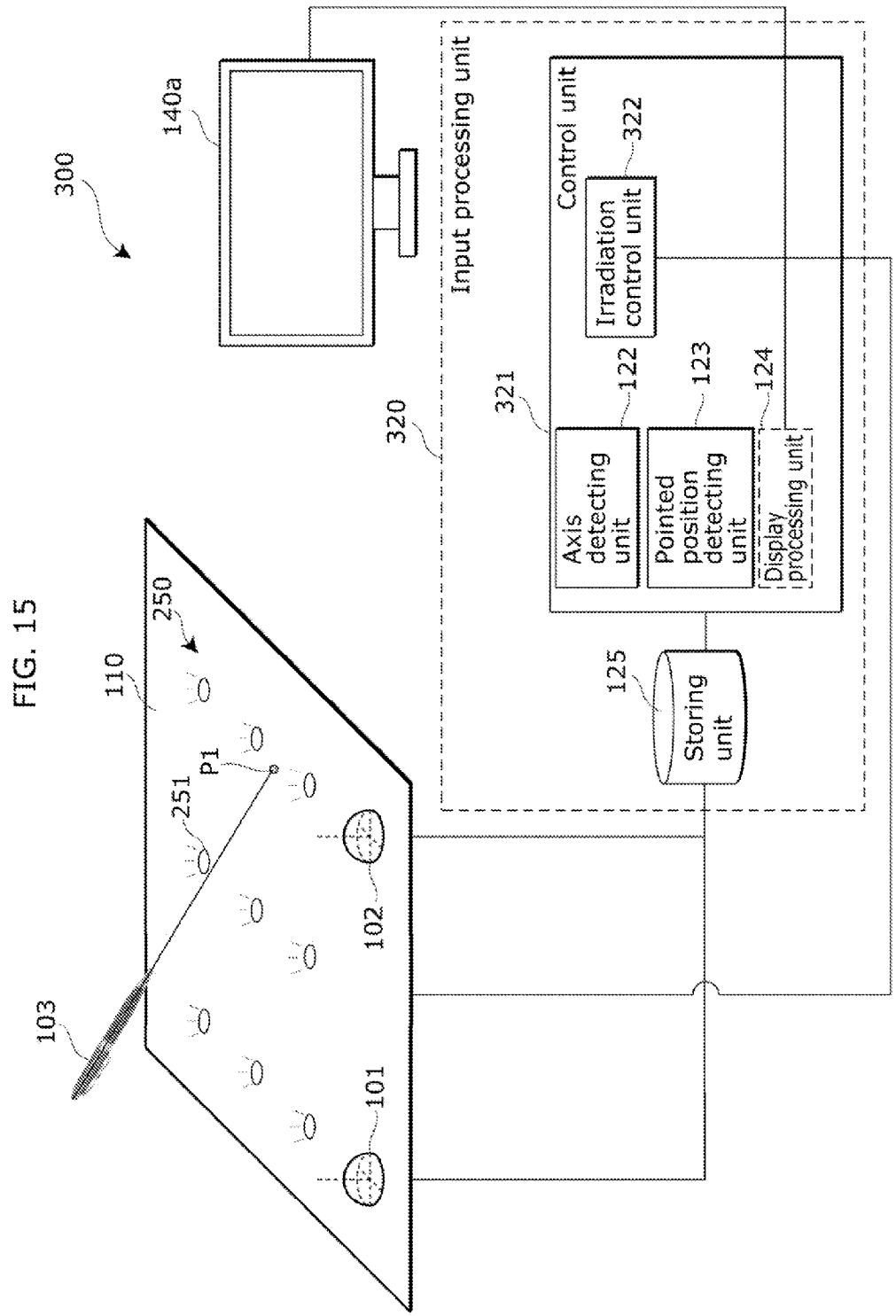

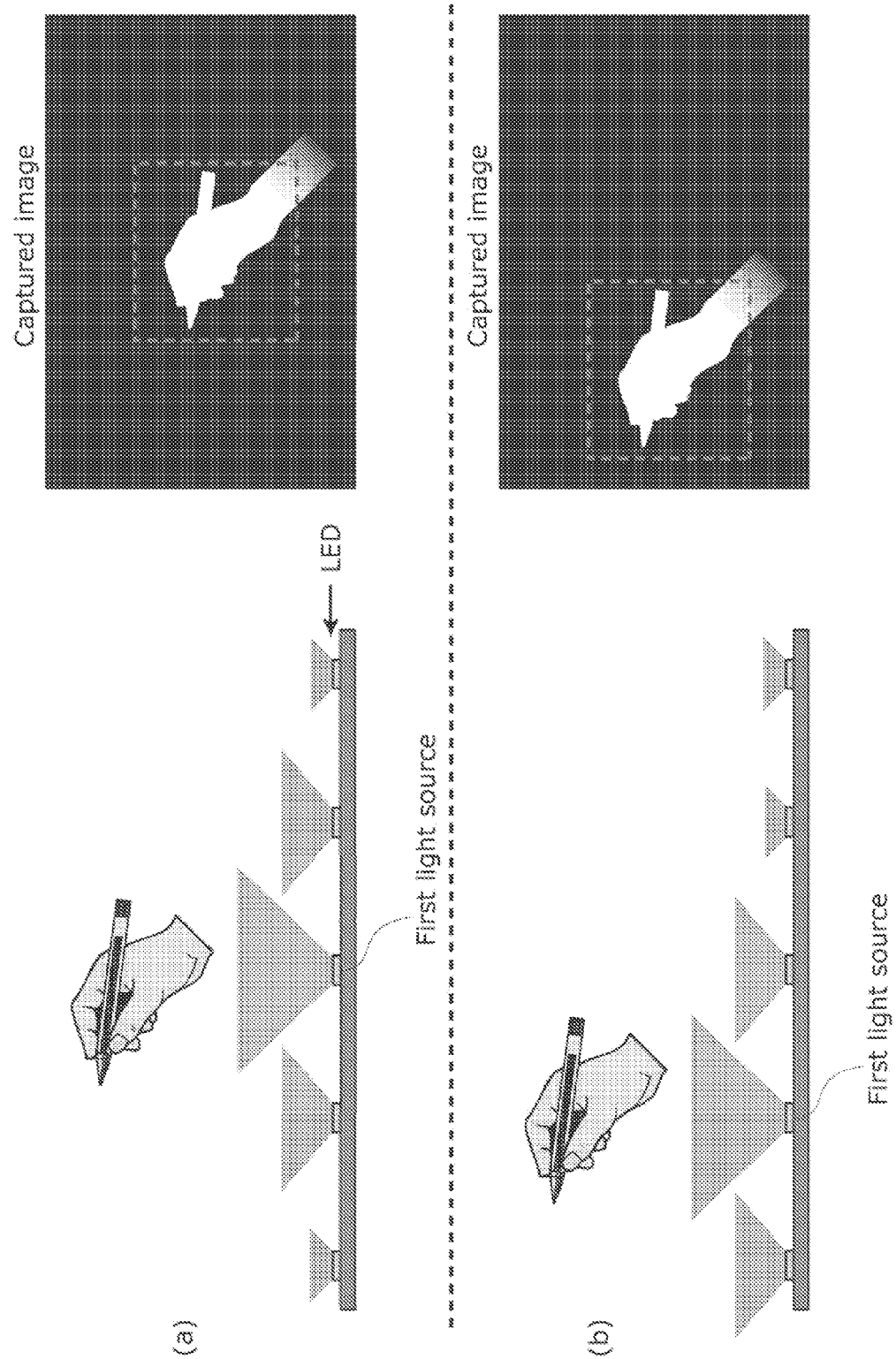

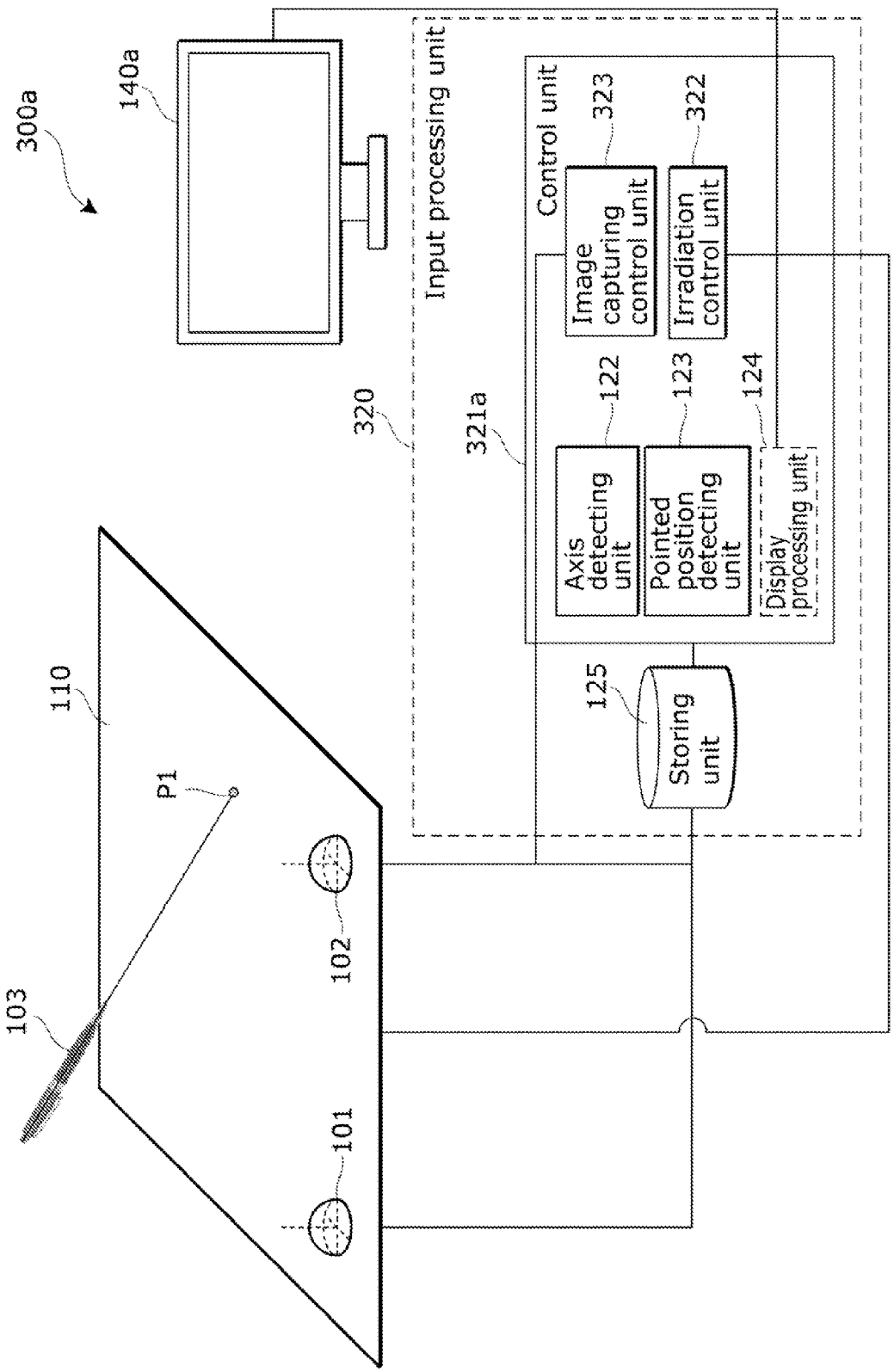

STYLUS DETECTING DEVICE AND STYLUS DETECTING METHOD

TECHNICAL FIELD

The present invention relates to a stylus detecting device and a stylus detecting method for detecting a pointed position, which is a position pointed to by a stylus, and using the detected pointed position to carry out a display processing.

BACKGROUND ART

Conventionally, input devices for operating a pointer or an icon displayed on a screen include the ones that detect a position of a stylus, thereby moving a pointer displayed on the screen according to a moving amount and a moving direction of that position (see Patent Literature (PTL) 1).

CITATION LIST

Patent Literature

[PTL 1] Japanese Unexamined Patent Application Publication No 2011-180690

SUMMARY OF INVENTION

Technical Problem

However, the technology according to PTL 1 has a problem that the stylus position cannot be detected accurately.

In view of the above-mentioned problem, it is an object of the present invention to provide a stylus detecting device and a stylus detecting method that can detect a stylus position accurately.

Solution to Problem

In order to achieve the object mentioned above, a stylus detecting device according to an aspect of the present invention is a stylus detecting device that detects a pointed position which is a position pointed to by a stylus, and includes a first camera; a second camera that is located at a position different from a position of the first camera and captures an image of at least a part of a capture target of the first camera; and a control unit that includes an axis detecting unit that detects a three-dimensional position and attitude of an axis of the stylus by using two images captured respectively by the first camera and the second camera, and a pointed position detecting unit that calculates as the pointed position a point of intersection between a straight line indicated by the axis of the stylus whose three-dimensional position and attitude have been detected by the axis detecting unit and a target plane having a predetermined positional relationship with respect to the first camera and the second camera.

As described above, the axis of the stylus is detected from a pair of images captured by the first camera and the second camera, and the point of intersection between a straight line obtained by extending the detected axis and a plane having a predetermined positional relationship with respect to the first camera and the second camera is detected as the pointed position, which is a position pointed to by the stylus. Accordingly, even when a user holds a front end portion of the stylus, for example, the pointed position pointed to by the stylus can be detected from an image of a portion of the stylus that is not held by the user. In this manner, the pointed position pointed to by the stylus can be detected regardless of the position held by the user, thus making it possible to detect the pointed position accurately.

It should be noted that these general or specific aspects may be realized by a method, an integrated circuit, a computer program or a recording medium such as a computer-readable CD-ROM, or may be realized by any combinations of the method, the integrated circuit, the computer program and the recording medium.

Advantageous Effects of Invention

The stylus detecting device according to the present invention can detect a stylus position accurately.

BRIEF DESCRIPTION OF DRAWINGS

FIG. 15 illustrates a configuration of a stylus detecting device according to Embodiment 3.

FIG. 16 is a diagram for describing irradiation control by an irradiation control unit of the stylus detecting device according to Embodiment 3.

FIG. 17 illustrates a configuration of a stylus detecting device according to another aspect of Embodiment 3.

DESCRIPTION OF EMBODIMENTS

Figure 1:
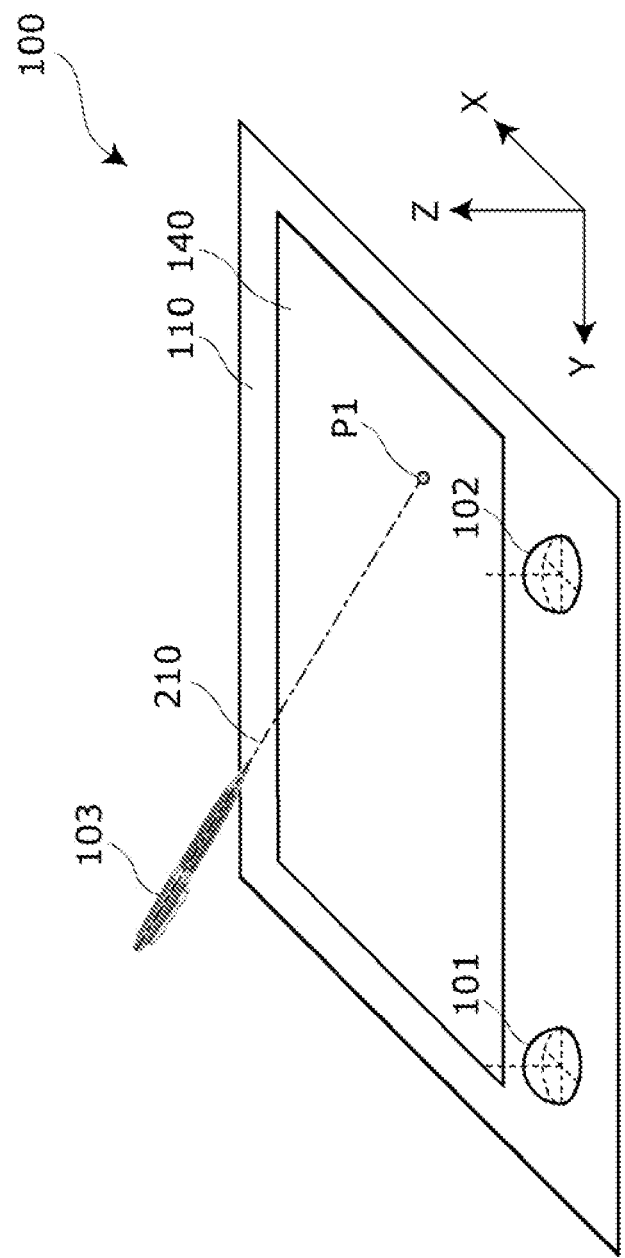
FIG. 1 is a schematic perspective view showing a stylus detecting device according to Embodiment 1 of the present invention.

Underlying Knowledge Forming Basis of the Present Invention

In relation to the stylus detecting device described in the Background Art section, the inventors have found the following problem.

In PTL 1, a position of an LED provided at the front end of the stylus is detected from an image captured by the camera, thereby detecting a position of a point to which the stylus points. However, when a user holds a front end portion of the stylus as he/she holds a pencil, the front end of the stylus is easy to be hidden behind a user's hand, making it difficult to recognize the front end of the stylus with the camera.

Other than the system of detecting the LED at the front end of the stylus by optical recognition (camera) as described in PTL 1, the systems of detecting the stylus position include a touch panel system, a magnetic sensor system and so on. However, with the touch panel system and the magnetic sensor system, it is difficult to accurately detect the stylus position for the following reasons.

In the touch panel system, since a touch panel for detecting a position that the stylus is in contact with or adjacent to is used, the stylus needs to be in contact with or adjacent to the touch panel. Accordingly, when a portion other than the front end of the stylus makes contact with the touch panel, for example, a user's hand makes contact with the touch panel, there is a problem that it is difficult to detect the front end of the stylus precisely.

Also, in the magnetic sensor system, it is difficult to detect the stylus position accurately.

In order to solve such problems, a stylus detecting device according to an aspect of the present invention is a stylus detecting device that detects a pointed position which is a position pointed to by a stylus, and includes a first camera; a second camera that is located at a position different from a position of the first camera and captures an image of at least a part of a capture target of the first camera; and a control unit that includes an axis detecting unit that detects a three-dimensional position and attitude of an axis of the stylus by using two images captured respectively by the first camera and the second camera, and a pointed position detecting unit that calculates as the pointed position a point of intersection between a straight line indicated by the axis of the stylus whose three-dimensional position and attitude have been detected by the axis detecting unit and a target plane having a predetermined positional relationship with respect to the first camera and the second camera.

As described above, the axis of the stylus is detected from a pair of images captured by the first camera and the second camera, and the point of intersection between a straight line obtained by extending the detected axis and a plane having a predetermined positional relationship with respect to the first camera and the second camera is detected as the pointed position, which is a position pointed to by the stylus. Accordingly, even when a user holds a front end portion of the stylus, for example, the pointed position pointed to by the stylus can be detected from an image of a portion of the stylus that is not held by the user. In this manner, the pointed position pointed to by the stylus can be detected regardless of the position held by the user, thus making it possible to detect the pointed position accurately.

Further, for example, the axis detecting unit may calculate a first axis, which is the axis of the stylus on a first image captured by the first camera, and a second axis, which is the axis of the stylus on a second image captured by the second camera, calculate a first plane through which the calculated first axis and the position of the first camera pass and a second plane through which the calculated second axis and the position of the second camera pass, and detect as the three-dimensional position and attitude of the axis of the stylus a line of intersection between the first plane and the second plane that are calculated.

As described above, the line of intersection between the first plane calculated from a stylus figure appearing in the first image and the second plane calculated from a stylus figure appearing in the second image is detected as the axis of the stylus. Thus, the axis detecting unit can detect the axis of the stylus accurately.

Moreover, for example, the stylus detecting device may further include a display unit, and the control unit may further include a display processing unit that displays a pointer at a predetermined position in the display unit corresponding to the pointed position calculated by the pointed position detecting unit.

In this manner, the position of the pointer displayed in the display unit is determined in correspondence with the pointed position, which is a position pointed to by the stylus. Therefore, by moving the stylus, it is possible to move the pointer displayed in the display unit.

Additionally, for example, the target plane may be a display surface of the display unit, and the display processing unit may display the pointer in the display unit to match the pointer with the pointed position.

In this manner, the pointed position and the position at which the pointer is displayed in the display unit are matched and displayed. This makes it possible for the user to move the pointer directly, allowing an intuitive operation.

Also, for example, the target plane may be a physical surface different from a display surface of the display unit.

Further, for example, the target plane may be a virtual plane.

Moreover, for example, a stylus detecting device that detects a pointed position which is a position in a three-dimensional space pointed to by a stylus may be provided, the device including a first camera; a second camera that is located at a position different from a position of the first camera and captures an image of at least a part of a capture target of the first camera; a storing unit that pre-stores a length of the stylus; and a control unit that includes an axis detecting unit that detects a three-dimensional position and attitude of an axis of the stylus by using two images captured respectively by the first camera and the second camera, a rear end portion detecting unit that detects a position of a rear end portion of the stylus by using the two images captured respectively by the first camera and the second camera, and a pointed position detecting unit that calculates as the pointed position a three-dimensional position of a front end portion of the stylus from the detected three-dimensional position and attitude of the axis of the stylus and the detected position of the rear end portion of the stylus and from the length of the stylus pre-stored in the storing unit.

As described above, the axis of the stylus is detected from a pair of images captured by the first camera and the second camera, and the three-dimensional position of the front end portion of the stylus is calculated from the detected axis of the stylus, the pre-stored length of the stylus and the position of the rear end portion of the stylus as the pointed position. Accordingly, even when a user holds a front end portion of the stylus, for example, the pointed position pointed to by the stylus can be detected from an image of a portion of the stylus that is not held by the user. In this manner, the pointed position pointed to by the stylus can be detected regardless of the position held by the user, thus making it possible to detect the pointed position accurately. Also, since the three-dimensional position is calculated as the pointed position, the above-described device can be utilized as an input device capable of drawing in a three-dimensional space.

Additionally, for example, the stylus detecting device may further include a display unit, and the control unit may further include a display processing unit that displays in the display unit a motion path traveled by a pointer displayed at a predetermined position in the display unit corresponding to the pointed position calculated by the pointed position detecting unit.

This allows the user to move the stylus, thereby displaying in the display unit the motion path traveled by the pointer.

Furthermore, for example, the control unit may further include a function setting unit that adjusts a setting to one of a first function of drawing a motion path of the pointed position in a first drawing mode and a second function of drawing the motion path in a second drawing mode different from the first drawing mode, and the display processing unit may display the motion path according to the one of the first function and the second function of the setting adjusted by the function setting unit.

In this manner, the motion path of the pointed position is displayed in the display unit according to the function of the setting adjusted by the function setting unit. For example, by a user's operation, the function of drawing in the first drawing mode where a black line is drawn is set as the first function, and the function of drawing in the second drawing mode where a red line is drawn is set as the second function. Thus, the user can switch these drawing modes, thereby displaying the motion path of the pointed position in the display unit in a user's desired drawing mode.

Further, for example, the stylus detecting device may further include a pressure detecting unit that is provided in the stylus and detects a pressure applied to the stylus by a user, and the function setting unit may adjust the setting to the first function when the pressure detecting unit detects the applied pressure and the second function when the pressure detecting unit does not detect the applied pressure.

As described above, the stylus is provided with the pressure detecting unit capable of detecting the pressure applied by the user, and the function setting unit adjusts the setting to either the first function or the second function according to whether the pressure is applied. In this manner, the user can switch the drawing modes by whether to apply the pressure to the stylus. Accordingly, the user can easily switch the drawing modes to be displayed in the display unit with his/her holding hand.

Moreover, for example, the stylus detecting device may further include a switch that is provided in the stylus and can be turned on or off, and the function setting unit may adjust the setting to the first function when the switch is on and the second function when the switch is off.

As described above, the stylus is provided with the switch that can be turned on or off, and the function setting unit adjusts the setting to either the first function or the second function according to whether the switch is turned on or off. In this manner, the user can switch the drawing modes by turning on or off the switch provided in the stylus. Accordingly, the user can easily switch the drawing modes to be displayed in the display unit with his/her holding hand.

Also, for example, the function setting unit may adjust the setting to one of the first function and the second function according to an external appearance of the stylus in an image captured by the first camera or the second camera.

In this manner, the user can switch the drawing modes of the setting adjusted by the function setting unit by, for example, changing the kind of the stylus, partially replacing the stylus or the like.

Further, for example, the function setting unit may adjust the setting to one of the first function and the second function according to an inclination of the detected axis of the stylus.

In this manner, the user can switch the drawing modes by changing the inclination of the stylus that is being held. Accordingly, the drawing modes to be displayed in the display unit can be switched easily by the user's mere hand movement.

Moreover, for example, the function setting unit may adjust the setting to a function of drawing a line to be thinner or thicker with an increase in an angle between the detected axis of the stylus and the target plane.

In this manner, the user can steplessly change the thickness of a line to be drawn by changing the inclination of the stylus that is being held.

Additionally, for example, the function setting unit may adjust the setting to one of the first function and the second function if an inclination of the axis of the stylus, the position of the pointer or a displacement amount of the position of the rear end portion of the stylus per unit time exceeds a predetermined threshold.

Accordingly, the user can switch the drawing modes of the setting adjusted by the function setting unit if the inclination of the axis of the stylus, the position of the pointer or the displacement amount of the position of the rear end portion of the stylus per unit time exceeds a predetermined threshold by moving the stylus quickly, for example, shaking the stylus or turning the stylus as in a pen twirling manner.

Also, for example, the control unit may further include a user selection unit that, if a plurality of axes of the stylus are detected, causes lines to be drawn in different drawing modes for individual pointed positions of the plurality of the detected styli.

In this way, even when a plurality of users use respective styli for input, they can perform drawing in the drawing modes corresponding to the individual users. This allows the users to easily distinguish which user has drawn what.

Further, for example, the stylus detecting device may further include a display unit that displays drawing by a displaying process; and an irradiation unit that irradiates with infrared radiation a target space whose image is captured by the first camera and the second camera. The display unit may emit light in a frequency band different from a frequency band of the infrared radiation emitted from the irradiation unit.

As described above, the frequency band of the infrared radiation emitted from the irradiation unit and the frequency band of the light emitted from the display unit are different. Thus, for example, with external light such as solar light being blocked, a figure appearing in a region where the infrared frequency band is detected in the images captured by the first camera and the second camera is considered as a figure attributed to the infrared radiation emitted from the irradiation unit. In other words, even when at least a figure attributed to the light emitted from the display unit or a figure of the display unit itself is captured, the figure attributed to the light emitted from the display unit can be ignored. Accordingly, since the figure appearing in the region where the infrared frequency band is detected in the images captured by the first camera and the second camera is not the figure attributed to the light emitted from the display unit, it is possible to reduce an error of stylus detection. Also, for example, by utilizing an infrared reflecting material as the material for the stylus, the accuracy of stylus detection can be raised further. Additionally, for example, by forming a member other than the stylus such as the display unit with an infrared absorbing material, the accuracy of stylus detection can be enhanced further.

Moreover, for example, the stylus detecting device may further include an irradiation unit that irradiates with infrared radiation a target space whose image is to be captured by the first camera and the second camera. An imaging device of the first camera or the second camera may include an RGB (red-green-blue) sensor for detecting RGB and an IR (infrared) sensor for detecting infrared radiation, the control unit may further include a mode switching unit that switches between a first mode and a second mode, the first mode being a mode in which, when the first camera and the second camera capture n frames per second, the IR sensor performs IR detection while the irradiation unit is emitting infrared radiation, and during the IR detection, the RGB sensor performs RGB detection at timing of at least 1/n frame, and the second mode being a mode in which the RGB detection is performed and, during the RGB detection, the irradiation unit emits infrared radiation and the IR detection is performed at timing of at least 1/n frame, where n is a natural number, and the mode switching unit may switch to the first mode if intensity of external light in an environment where the first camera or the second camera is located is smaller than a predetermined threshold and to the second mode if the intensity of external light in the environment is larger than the predetermined threshold.

This makes it possible to improve the accuracy of stylus detection and reduce power consumption.

Additionally, for example, the stylus detecting device may further include an irradiation unit including a plurality of light sources that irradiate with infrared radiation a target space whose image is captured by the first camera and the second camera, and the control unit may further include an irradiation control unit that, when a first light source denotes a light source that irradiates the detected position of the stylus among the plurality of light sources, makes an amount of light from light sources other than the first light source lower than an amount of light from the first light source.

As described above, the irradiation control unit makes the amount of light from the light source irradiating the periphery of the position where the stylus is detected lower than the amount of light from the first light source. In this manner, since the irradiation control unit reduces the amount of light from the light sources substantially unnecessary for the stylus detection, it is possible to minimize a decrease in the accuracy of stylus detection and reduce power consumption.

Furthermore, for example, the control unit may further include an image capturing control unit that reduces a frame rate for image capturing by the first camera and the second camera if a movement amount of the detected stylus per unit time is equal to or smaller than a predetermined threshold, and raises the frame rate if the movement amount per unit time exceeds the threshold.

As described above, the capturing control unit raises or lowers the frame rate for capturing by the first camera and the second camera according to the increase or decrease in a moving speed of the stylus. Thus, it becomes possible to minimize a decrease in the accuracy of stylus detection and reduce power consumption.

Additionally, for example, the stylus detecting device may further include a first stylus including a first light-emitting unit that emits light in a first light-emitting pattern at a plurality of different first timings, and a second stylus including a second light-emitting unit that emits light in a second light-emitting pattern different from the first light-emitting pattern. The control unit may further include an emitted light recognizing unit that causes the first camera and the second camera to capture images at a plurality of timings including the first timings and a plurality of second timings, each of which is a light-emitting timing corresponding to the second light-emitting pattern, recognizes as the first stylus the stylus with a light-emitting unit emitting light in the image captured at the first timings, and recognizes as the second stylus the stylus with a light-emitting unit emitting light in the image captured at the second timings.

In this manner, the first stylus having the first light-emitting unit and the second stylus having the second light-emitting unit can be distinguished and recognized.

Furthermore, for example, the control unit may further include a knitting state determining unit that determines a current knitting state based on shape information of a yarn obtained by analyzing images captured by the first camera and the second camera by cloth simulation, an estimated axis of the stylus and an estimated position of the front end portion of the stylus, and an instruction presenting unit that calculates an instruction for instructing how to knit next by comparing the current knitting state determined by the knitting state determining unit with knitting design information designed in advance, and displays the instruction.

In this manner, when a user does his/her knitting, the current knitting state is determined by the cloth simulation. Then, for example, if the design information indicating a completed article is set in advance, it is possible to compare the determined current knitting state with the design information, thereby presenting the next knitting procedure. Thus, merely by setting the design information of a desired knitting article in advance, the user can proceed with knitting according to the presented instruction to complete the desired knitting article even when he/she does not know how to knit next.

It should be noted that these general or specific aspects may be realized by a method, an integrated circuit, a computer program or a recording medium such as a computer-readable CD-ROM, or may be realized by any combinations of the method, the integrated circuit, the computer program and the recording medium.

Hereinafter, the stylus detecting device and the stylus detecting method according to one aspect of the present invention will be described specifically, with reference to accompanying drawings.

It should be noted that any of the embodiments described below will illustrate one specific example of the present invention. The numerical values, shapes, materials, structural components, the arrangement and connection of the structural components, and the steps and the order of steps shown in the following embodiments are merely an example and thus do not intend to limit the present invention. Further, among the structural components in the following embodiments, the one that is not recited in any independent claim exhibiting the most generic concept will be described as an arbitrary structural component.

Embodiment 1

Typically, the stylus detecting device according to one aspect of the present invention is directed to an input device for detecting changes over time in the position of a stylus held by a user, whereby the position of a pointer displayed in a display unit is changed over time according to the direction and amount of the changes over time, namely, a pointing device.

Figure 2:
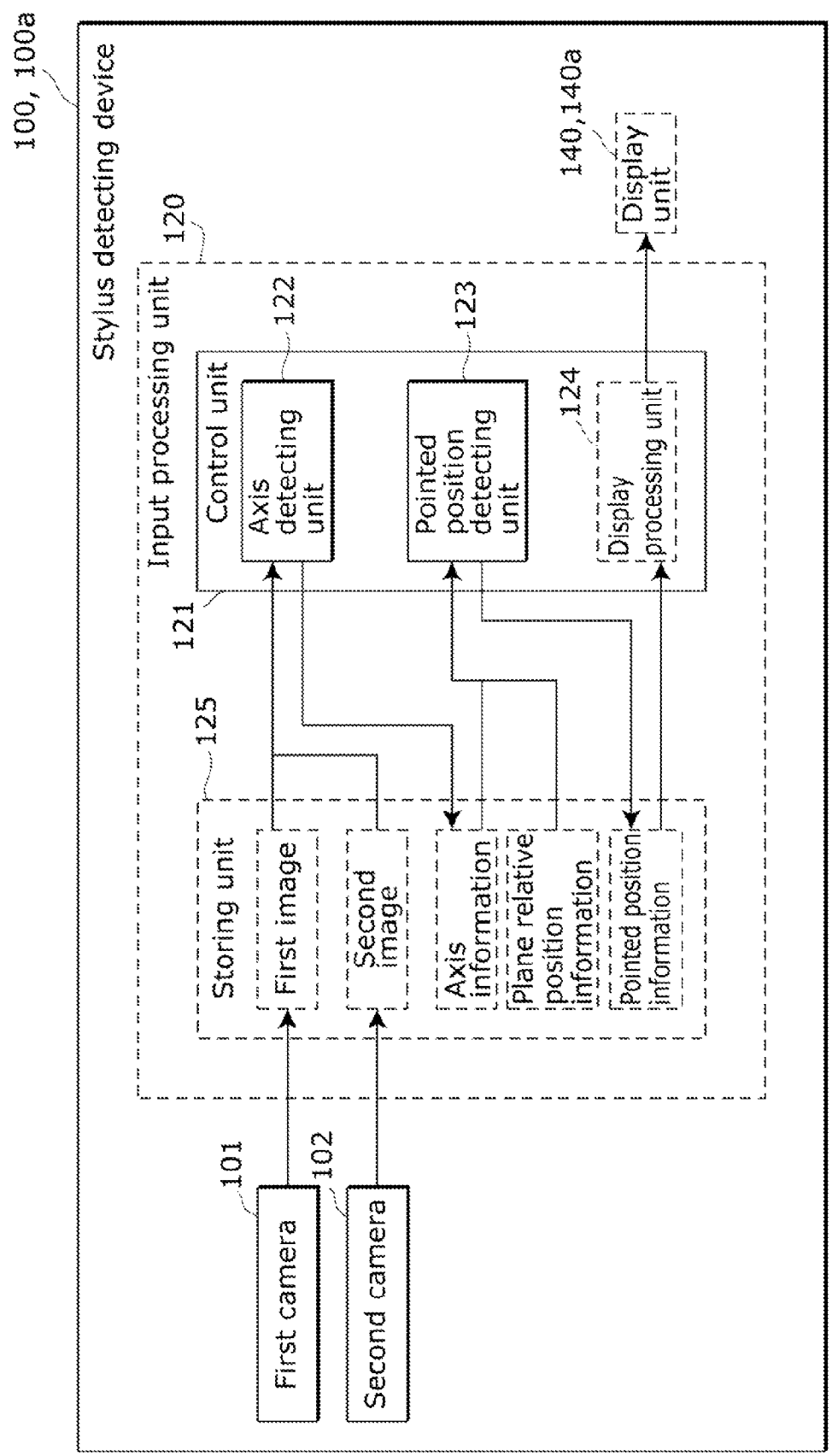
FIG. 2 is a block diagram showing a configuration of the stylus detecting device according to Embodiment 1 of the present invention.

FIG. 1 is a schematic perspective view showing a stylus detecting device 100 according to Embodiment 1 of the present invention. FIG. 2 is a block diagram showing a configuration of the stylus detecting device 100 according to Embodiment 1 of the present invention.

The stylus detecting device 100 includes a first camera 101, a second camera 102, a control unit 121, a storing unit 125 and a display unit 140.

The first camera 101 and the second camera 102 are disposed at different positions on a target plane 110 and capture images of a common capture target space. The first camera 101 and the second camera 102 are secured at predetermined positions with respect to the target plane 110. The target plane 110 is a plane pointed to by the stylus 103, and a display surface of the display unit 140 serves as the target plane 110 in Embodiment 1. The first camera 101 and the second camera 102 capture images at the same timing and have a frame rate of, for example, 60 fps. In other words, the capture timing of the first camera 101 and the capture timing of the second camera 102 are synchronized. Incidentally, the capture timing of the first camera 101 and the capture timing of the second camera 102 do not have to be synchronized exactly. It is only necessary to obtain an image pair, which is a pair of images constituted by a first image and a second image captured at substantially the same timing (with a difference in timing not greater than a predetermined threshold, for example). The image pair captured by the first camera 101 and the second camera 102 is stored in the storing unit 125.

The first camera 101 and the second camera 102 may be independent separate cameras or formed into one piece as a stereo camera. In other words, the first camera 101 and the second camera 102 may have any configurations as long as they can capture a common capture target space from different angles.

The control unit 121 processes two images captured respectively by the first camera 101 and the second camera 102, thereby calculating a pointed position P1 pointed to by the stylus 103. More specifically, the control unit 121 is a processing unit constituting a computer such as a CPU.

The control unit 121 includes an axis detecting unit 122, a pointed position detecting unit 123 and a display processing unit 124.

Using the two images captured respectively by the first camera 101 and the second camera 102 at the same timing, the axis detecting unit 122 detects an axis of the stylus 103 at that timing. Axis information indicating the axis of the stylus 103 detected by the axis detecting unit 122 is stored in the storing unit 125.

The pointed position detecting unit 123 detects, as the pointed position P1, a point of intersection between a straight line 210 coinciding with the axis of the stylus 103 detected by the axis detecting unit 122 and the target plane 110. Pointed position information indicating the pointed position P1 detected by the pointed position detecting unit 123 is stored in the storing unit 125.

The display processing unit 124 displays a pointer at a predetermined position on the screen of the display unit 140 corresponding to the pointed position P1 calculated by the pointed position detecting unit 123.

The storing unit 125 pre-stores plane relative position information indicating the positional relationship between the target plane 110 and the first and second cameras 101 and 102. Also, the storing unit 125 temporarily stores the first image captured by the first camera 101, the second image captured by the second camera 102, the axis information calculated by the axis detecting unit 122 and the pointed position information calculated by the pointed position detecting unit 123. More specifically, the storing unit 125 is composed of a storage device such as a nonvolatile memory, a volatile memory or a hard disk, and may be a combination thereof.

It should be noted that the control unit 121 and the storing unit 125 serve as an input processing unit 120.

The stylus 103 subjected to image processing by the control unit 121 may be a spherical body or a quadrangular prism such as a die. In this case, when the axis of the stylus is to be identified, a portion with the largest diameter in the shape recognized in the image may be identified as the axis of the stylus. Also, when the stylus 103 has a shape whose diameter is largest in all directions as in a spherical body, a line that passes through the center of the spherical body and is parallel with a Z axis direction in an initially recognized attitude may be identified as the axis of the stylus, for example. Further, when the stylus 103 has a shape in which a plurality of the largest diameters are recognized as in a quadrangular prism, a portion with the largest diameter that extends in a direction closest to the Z axis direction in the attitude initially recognized by the control unit 121 may be identified as the axis of the stylus, for example.

Figure 3:
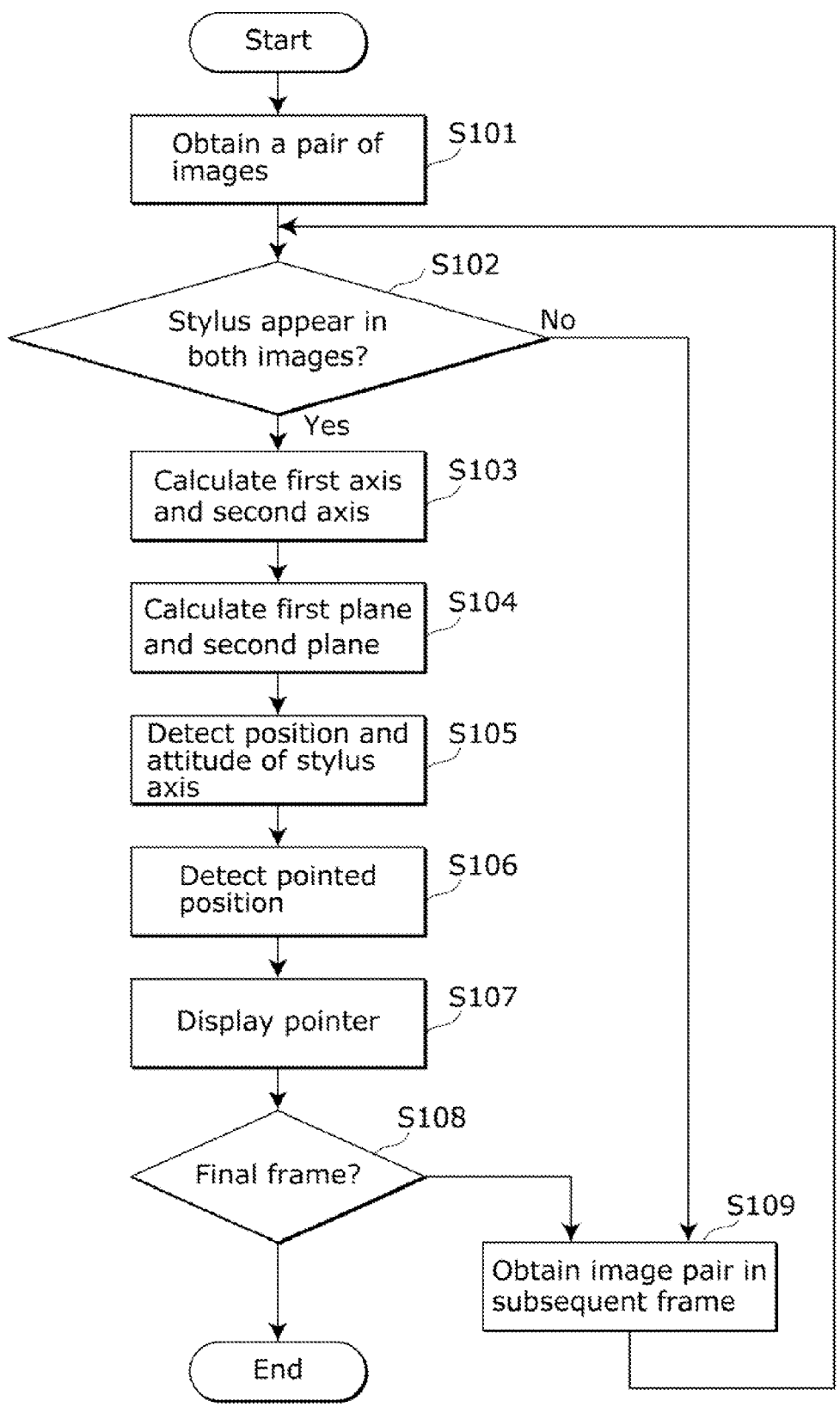
FIG. 3 is a flowchart showing a flow of a pointed position detecting process carried out by a control unit.
Figure 4:
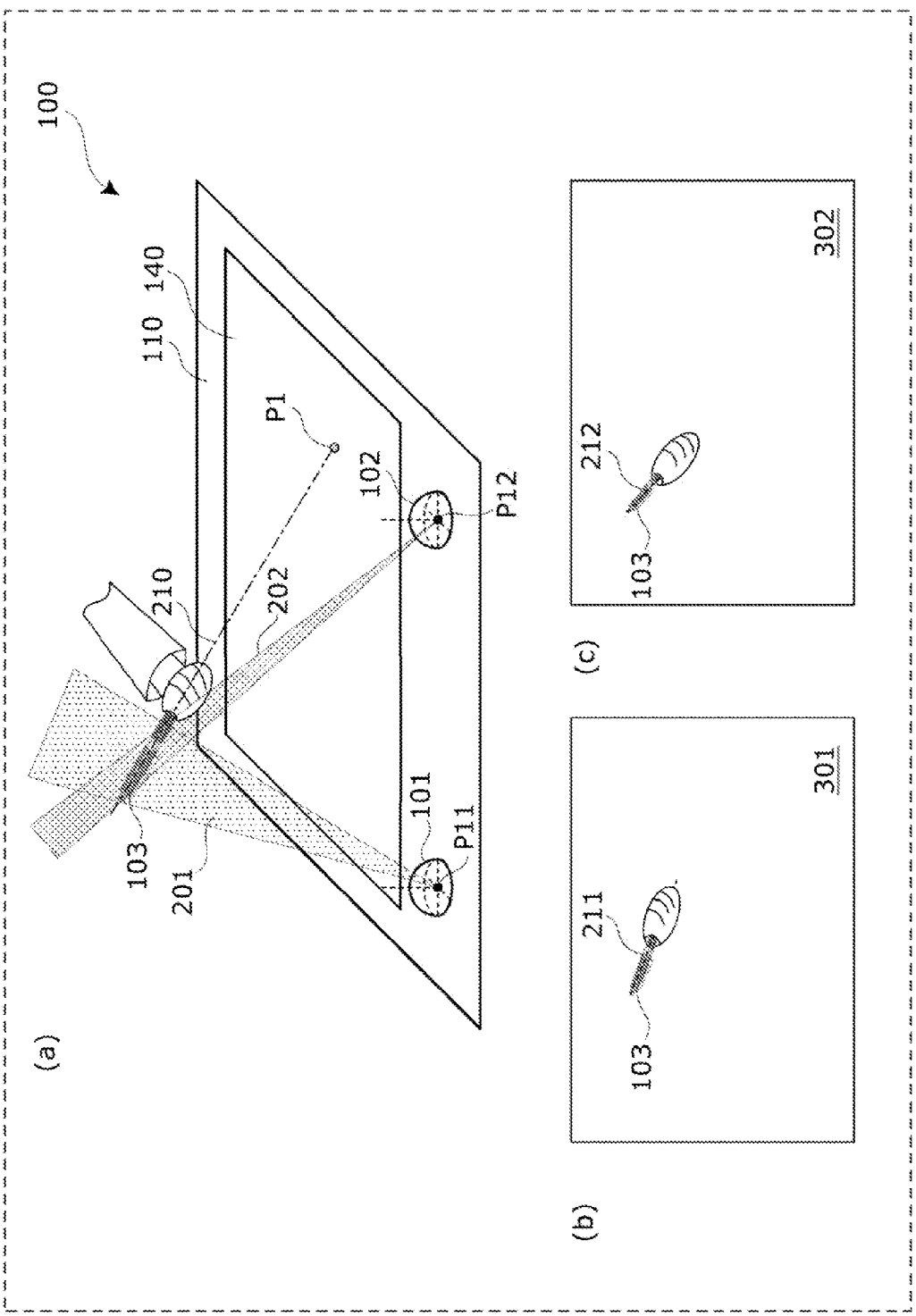
FIG. 4 is a diagram for describing the pointed position detecting process carried out by the control unit.

Referring to FIG. 3 and FIG. 4, the pointed position detecting process as a stylus detecting method for detecting a position pointed to by a stylus will be described below.

FIG. 3 is a flowchart showing a flow of the pointed position detecting process carried out by the control unit 121. Here, (a) in FIG. 4 is a diagram for describing the pointed position detecting process carried out by the control unit 121, (b) in FIG. 4 is a diagram for describing how the axis detecting unit 122 calculates a first axis 211 from a first image 301, and (c) in FIG. 4 is a diagram for describing how the axis detecting unit 122 calculates a second axis 212 from a second image 302.

First, the control unit 121 obtains an image pair of the first image 301 and the second image 302 that are captured at the same timing (S101). In other words, the control unit 121 obtains the image pair stored in the storing unit 125.

Next, the axis detecting unit 122 determines whether the stylus 103 appears in both of the first image 301 and the second image 302 (S102). If the stylus 103 is not determined to appear in both of the first image 301 and the second image 302 (S102: No), a pair of images captured at timing subsequent to a current frame (an image pair in a subsequent frame) are obtained (S109), then returning to Step S102. This prevents an unnecessary pointed position detecting process afterwards in the case where the stylus 103 cannot be detected, for example, where the stylus 103 appears only one of or neither of the image pair. In other words, it becomes possible to reduce processing load. Incidentally, the determining process in Step S102 is not a required process.

If the stylus is determined to appear in both of the first image 301 and the second image 302 (S102: Yes), the axis detecting unit 122 calculates the first axis 211, which is the axis of the stylus 103 in the first image 301, and the second axis 212, which is the axis of the stylus 103 in the second image 302, as shown in (b) and (c) of FIG. 4 (S103).

Then, the axis detecting unit 122 calculates a first plane 201 through which the calculated first axis 211 and the position of the first camera 101 pass and a second plane 202 through which the calculated second axis 212 and the position of the second camera 102 pass as shown in (a) of FIG. 4 (S104). At this time, the axis detecting unit 122 determines the positions of the first camera 101 and the second camera 102 from the plane relative position information stored in the storing unit 125.

If the stylus 103 appears in the first image 301, the position of the stylus 103 in that first image is subjected to an image analysis, so that a direction of the stylus 103 with respect to a position P11 of the first camera 101 can be determined. In other words, the first plane 201 is a plane in a three-dimensional space indicating the direction of the stylus 103 with respect to the position P11 of the first camera 101. Similarly, if the stylus 103 appears in the second image 302, the position of the stylus 103 in that second image is subjected to an image analysis, so that a direction of the stylus 103 with respect to a position P12 of the second camera 102 can be determined. In other words, the second plane 202 is a plane in the three-dimensional space indicating the direction of the stylus 103 with respect to the position P12 of the second camera 102.

The axis detecting unit 122 detects, as the three-dimensional position and attitude of the axis of the stylus 103, a line of intersection between the first plane 201 and the second plane 202 that have been calculated (S105). The first plane 201 and the second plane 202 that have been calculated indicate the direction of the stylus 103 with respect to the position P11 of the first camera 101 and that with respect to the position P12 of the second camera 102 as described above. Thus, the line of intersection between the first plane 201 and the second plane 202 can be considered as the axis of the stylus 103.

The pointed position detecting unit 123 calculates, as the pointed position P1, the point of intersection between the straight line 210 indicating the direction of the detected axis of the stylus 103 and the target plane 110 having a predetermined positional relationship with respect to the first camera 101 and the second camera 102 (S106). The display processing unit 124 displays the pointer at the predetermined position of the display unit 140 corresponding to the calculated pointed position P1 (S107).

The control unit 121 determines whether the current frame is a final frame (S108). In other words, the control unit 121 determines whether a subsequent frame is present in the storing unit 125. If the control unit 121 determines that the current frame is the final frame (S108: Yes), it ends the pointed position detecting process. If the control unit 121 does not determine that the current frame is the final frame (S108: No), a pair of images captured at timing subsequent to the current frame (an image pair in a subsequent frame) are obtained (S109), then returning to Step S102.

With the stylus detecting device 100 according to Embodiment 1 described above, the axis of the stylus 103 is detected from the pair of images captured by the first camera 101 and the second camera 102, and the point of intersection between the straight line 210 obtained by extending the detected axis and the target plane 110 having the predetermined positional relationship with respect to the first camera 101 and the second camera 102 is detected as the pointed position P1, which is the position pointed to by the stylus. Accordingly, even when a user holds a front end portion of the stylus 103, for example, the pointed position pointed to by the stylus 103 can be detected from the image of a portion of the stylus 103 that is not held by the user. In this manner, the pointed position pointed to by the stylus 103 can be detected regardless of the position held by the user, thus making it possible to detect the pointed position accurately.

Also, with the stylus detecting device 100 according to Embodiment 1 described above, the line of intersection between the first plane 201 calculated from the stylus 103 appearing in the first image 301 and the second plane 202 calculated from the stylus 103 appearing in the second image 302 is detected as the axis of the stylus. Thus, the axis detecting unit 122 can detect the axis of the stylus accurately.

Further, with the stylus detecting device 100 according to Embodiment 1 described above, the position of the pointer to be displayed in the display unit 140 is determined according to the pointed position, which is a position pointed to by the stylus 103. Therefore, by moving the stylus 103, it is possible to move the pointer displayed in the display unit.

Moreover, with the stylus detecting device 100 according to Embodiment 1 described above, the pointed position P1 and the position at which the pointer is displayed in the display unit 140 are matched and displayed. This makes it possible for the user to move the pointer directly, allowing an intuitive operation.

[Variation 1]

Figure 5:
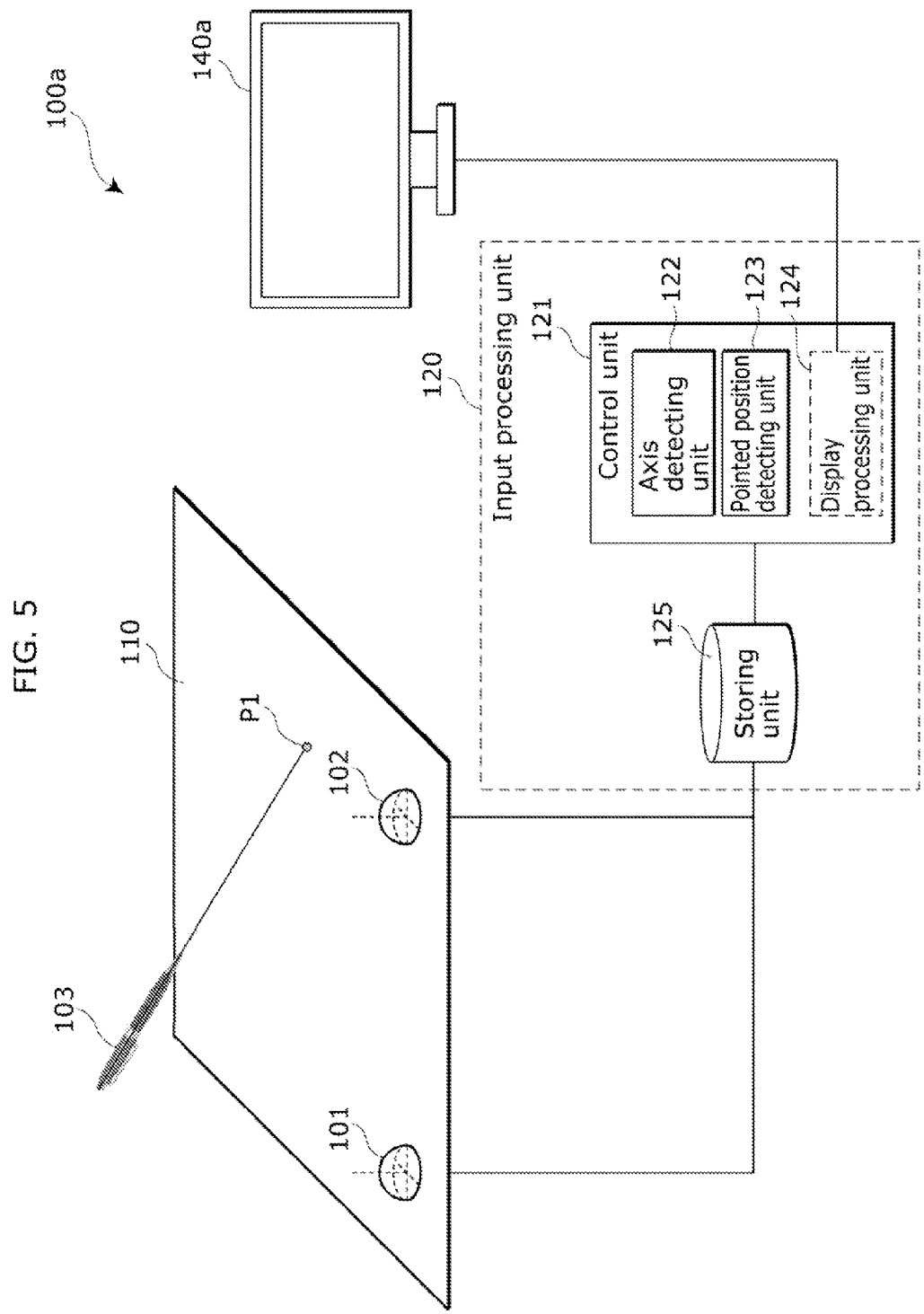
FIG. 5 illustrates a configuration of a stylus detecting device according to Variation 1 of Embodiment 1.

Although the stylus detecting device 100 according to Embodiment 1 described above has a configuration in which the target plane 110 and the display surface of the display unit 140 are matched, there is no limitation to this configuration. For example, as shown in FIG. 5, it may be possible to provide a stylus detecting device 100a having a configuration in which the target plane 110 and a display unit 140a are separate. In this case, it is conceivable that the target plane 110 may be set to a whiteboard surface, a desktop surface or the like, for example.

Further, in Embodiment 1 described above, the first camera 101 and the second camera 102 are secured at the predetermined positions with respect to the target plane 110, and the plane relative position information indicating the positional relationship between the target plane 110 and the first and second cameras 101 and 102 is pre-stored in the storing unit 125. However, there is no limitation to the plane relative position information being pre-stored in the storing unit 125. For example, after the first camera 101 and the second camera 102 are secured at user's desired positions, the user may set a virtual plane located at an arbitrary position in the space to be the target plane 110 or may set, by performing calibration, a physical surface such as a surface of a desk or a whiteboard to be the target plane 110. This allows the user to set the target plane 110 at his/her disposal.

Moreover, in Embodiment 1 described above, the display processing unit 124 displays the pointer at the predetermined position on the screen of the display unit 140 corresponding to the pointed position P1 calculated by the pointed position detecting unit 123. However, it is not necessary to display the pointed position P1 in the display unit 140. In other words, the display processing unit 124 and the display unit 140 do not have to be included in the stylus detecting device 100. In such a case, the storing unit 125 stores, as a motion path, a position pointed to by the stylus 103 on the target plane 110. For example, at this time, it may be possible to cause an external display device to read motion path information, which indicates the motion path stored in the storing unit 125, therein and display the motion path pointed to by the stylus 103 on the target plane 110.

[Variation 2]

The stylus detecting device 100 according to Embodiment 1 described above detects the position and attitude of the axis of the stylus 103 in the three-dimensional space, thereby deriving the point of intersection between the straight line indicated by the axis of the stylus and the target plane 110 as the pointed position. As described above, since the position pointed to by the stylus 103 on the target plane 110 is recognized in the stylus detecting device 100, a two-dimensional position is inputted. However, it may be possible to provide a stylus detecting device 100*b* having a configuration capable of detecting a three-dimensional position.

Figure 6:
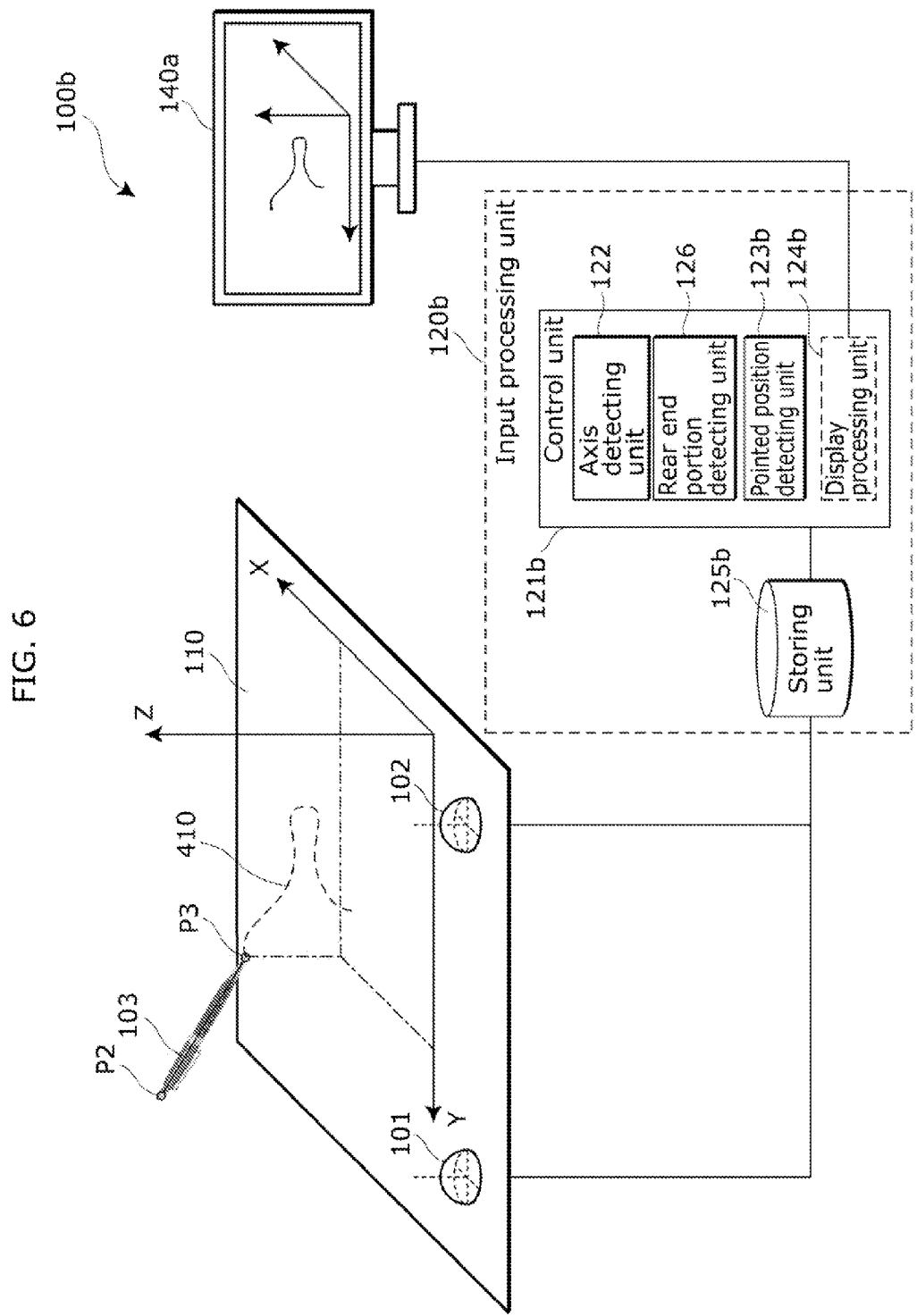
FIG. 6 illustrates a configuration of a stylus detecting device according to Variation 2 of Embodiment 1.
Figure 7:
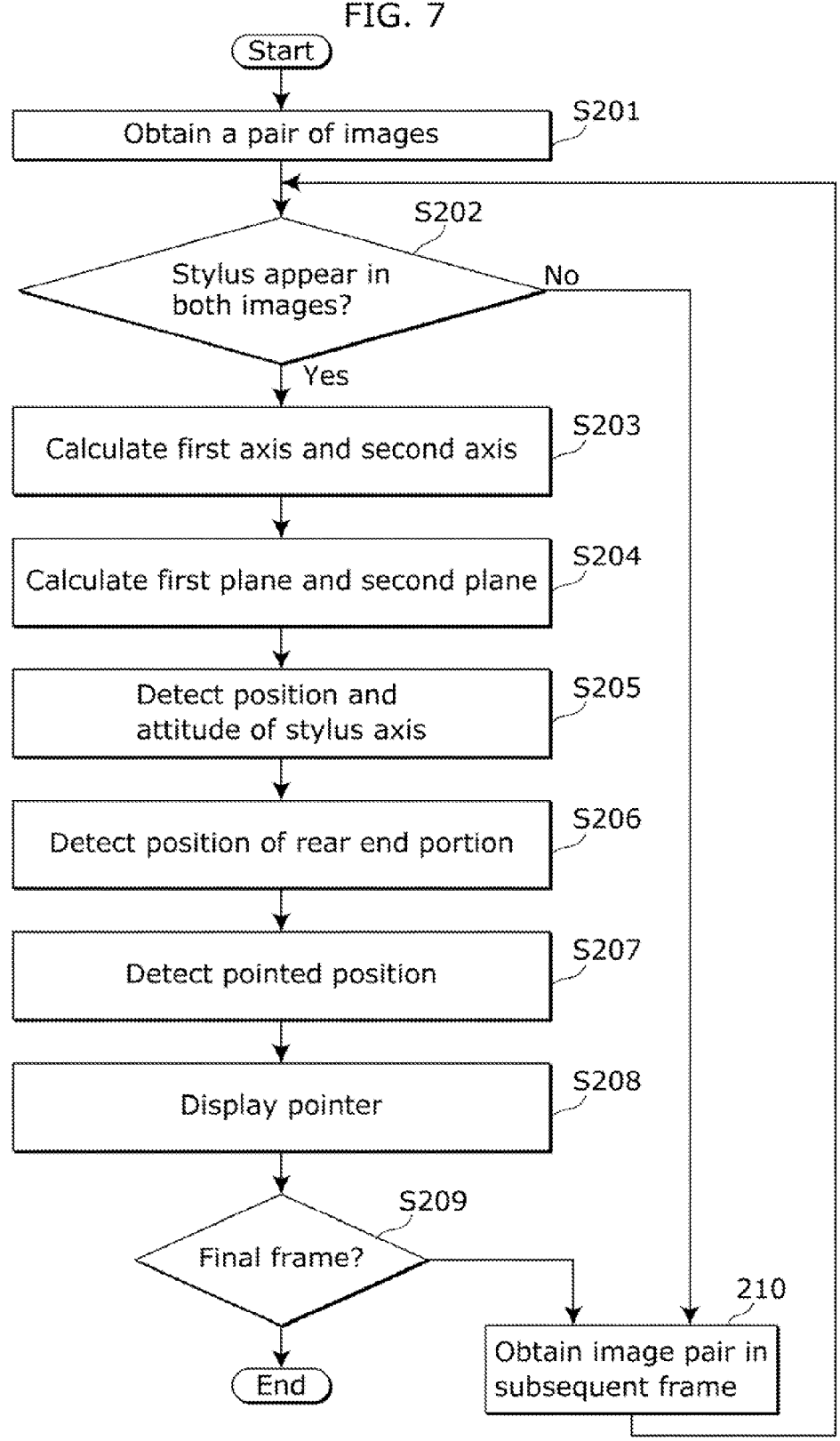
FIG. 7 is a flowchart showing a flow of a pointed position detecting process according to Variation 2 of Embodiment 1.

FIG. 6 illustrates the configuration of the stylus detecting device 100*b* according to Variation 2 of Embodiment 1.

The stylus detecting device 100*b* according to Variation 2 is different from the stylus detecting device 100 according to Embodiment 1 described above in that a control unit 121*b* of an input processing unit 120*b* has a rear end portion detecting unit 126. Also, a pointed position detecting unit 123*b* is different from the pointed position detecting unit 123 in Embodiment 1 in that it detects a position pointed to by the stylus 103 as a pointed position in a three-dimensional space. Further, information pre-stored in a storing unit 125*b* is different from that stored in the storing unit 125 in Embodiment 1. Moreover, a display processing unit 124*b* is different from the display processing unit 124 in Embodiment 1 in that it causes the display unit 140*a*, which is an external device, to three-dimensionally display a position P3 of a front end of the stylus 103 in the three-dimensional space detected by the pointed position detecting unit 123*b*. Additionally, how the pointed position detecting unit 123*b* calculates the pointed position is different from Embodiment 1. Thus, the following description will be directed only to a configuration different from that of the stylus detecting device 100 according to Embodiment 1 described above, and the description of a common configuration and a common operation will be omitted.

The rear end portion detecting unit 126 detects a position of a rear end portion of the stylus 103 using two images that are captured respectively by the first camera 101 and the second camera 102. It is noted that the "rear end portion of the stylus 103" herein refers to an end portion that is not a front end portion out of both end portions of the stylus 103 along its longitudinal direction. When the front end portion and the rear end portion of the stylus 103 have the same shape, the "rear end portion of the stylus 103" refers to either one of these end portions. In other words, it may be any one of the both end portions that is predetermined by a user as the rear end portion of the stylus 103. For example, the rear end portion detecting unit 126 uses rear end portion information such as a shape, a color and so on of the rear end portion of the stylus 103 pre-stored in the storing unit 125*b* to perform image processing (image matching) of figures of the stylus 103 appearing in the first image 301 and the second image 302, thereby detecting the rear end portion of the stylus 103. At this time, for example, the stylus 103 may have a light-emitting unit in its rear end portion so as to facilitate the detection of the rear end portion, or only the rear end portion of the stylus 103 may be surface-treated to be, for example, close to a mirror-smooth state so as to enhance light reflection. In this case, the rear end portion detecting unit 126 does not have to detect the rear end portion of the stylus 103 by the image matching but may detect a region with a high brightness value in the detected image of the stylus 103 as the rear end portion. Further, when the stylus 103 is formed of a material easy to reflect infrared radiation and irradiated with infrared radiation in order to accurately detect the stylus 103 from the first image 301 and the second image 302, the material of the rear end portion of the stylus 103 may be set to reflect infrared radiation more easily than that of the rest of the stylus 103. That is to say, in this case, the rear end portion detecting unit 126 detects, as the rear end portion of the stylus 103, a region determined to emit more infrared components in the first image 301 and the second image 302.

For example, when the rear end portion detecting unit 126 detects, by the image processing, a figure of at least one end portion of the stylus 103 out of the figures of the stylus 103 appearing in the first image 301 and the second image 302, it may detect at least an end portion farther from a user's hand in the detected end portion figure as the rear end portion of the stylus 103.

The storing unit 125*b* stores stylus information indicating the length of the stylus 103 instead of the plane relative position information pre-stored in the storing unit 125 of Embodiment 1 described above.

The pointed position detecting unit 123*b* calculates, as the pointed position, the position of the front end portion of the stylus 103 in the three-dimensional space from the three-dimensional position and attitude of the stylus axis detected by the axis detecting unit 122, the position P2 of the rear end portion of the stylus 103 detected by the rear end portion detecting unit 125 and the stylus information pre-stored in the storing unit 125*b*. In other words, using the three-dimensional position and attitude of the axis of the stylus 103, the position P2 of the rear end portion of the stylus 103 and the stylus information, the pointed position detecting unit 123*b* calculates, as the position P2 of the front end portion of the stylus 103, the position of a front end side of the stylus 103 that is distant by the length of the stylus 103, which is indicated by the stylus information, from the position P2 of the rear end portion of the stylus 103 along the direction indicated by the axis of the stylus 103 determined by the three-dimensional position and attitude of the axis of the stylus 103. It should be noted that the "front end side of the stylus 103" herein refers to a side on which a body of the stylus 103 appears with respect to the position of the rear end portion in the figure of the stylus 103 appearing in the first image 301 and the second image 302.

The display processing unit 124*b* displays the pointer at a position in a virtual three-dimensional space that is expressed virtually in the display unit 140 so as to correspond to the position P3 of the front end portion of the stylus 103 in the three-dimensional space calculated by the pointed position detecting unit 123*b*. Also, when the pointed position detecting unit 123*b* detects a movement of the front end portion of the stylus 103 (position P3), the display processing unit 124*b* moves and displays the pointer displayed relatively at a position in the virtual three-dimensional space in correspondence with the amount and direction of the movement of the front end portion of the stylus 103 (position P3) in the virtual three-dimensional space.

The following is a description of the pointed position detecting process as the stylus detecting method carried out by the stylus detecting device 100*b*. Each processing in Steps S201 to S205 of the pointed position detecting process carried out by the stylus detecting device 100*b* is similar to that in Steps S101 to S105 of the pointed position detecting process described in FIG. 3. Thus, the description of the processing in these parts will be omitted, and the processing in Step S206 and thereafter will be described.

After Step S205, the rear end portion detecting unit 126 detects the position of the rear end portion of the stylus 103 using the two images that are captured respectively by the first camera 101 and the second camera 102 (S206). From the three-dimensional position and attitude of the stylus axis calculated in Step S205, the position P2 of the rear end portion of the stylus 103 detected in Step S206 and the stylus information pre-stored in the storing unit 125*b*, the pointed position detecting unit 123*b* calculates, as the pointed position, the position P3 of the front end portion of the stylus 103 in the three-dimensional space (S207). The display processing unit 124 displays the pointer at the predetermined position of the display unit 140 corresponding to the calculated pointed position P1 (S208).

The control unit 121 determines whether the current frame is a final frame (S209). In other words, the control unit 121*b* determines whether a subsequent frame is present in the storing unit 125*b*. If the control unit 121*b* determines that the current frame is the final frame (S209: Yes), it ends the pointed position detecting process. If the control unit 121 does not determine that the current frame is the final frame (S209: No), a pair of images captured at timing subsequent to the current frame (an image pair in a subsequent frame) are obtained (S210), then returning to Step S202.

With the stylus detecting device 100*b* according to Variation 2 of Embodiment 1 described above, the axis of the stylus 103 is detected from a pair of images captured by the first camera 101 and the second camera 102, and the three-dimensional position P3 of the front end portion of the stylus 103 is calculated as the pointed position from the position and attitude of the detected axis of the stylus 103, the pre-stored length of the stylus 103 and the position P2 of the rear end portion of the stylus 103. Accordingly, even when a user holds the front end portion of the stylus 103, for example, the pointed position pointed to by the stylus can be detected from the image of a portion of the stylus 103 that is not held by the user. In this manner, the pointed position pointed to by the stylus 103 can be detected regardless of the position held by the user, thus making it possible to detect the pointed position accurately. Also, since the three-dimensional position is calculated as the pointed position, the above-described device can be utilized as the input device capable of drawing in the three-dimensional space.

Figure 8:
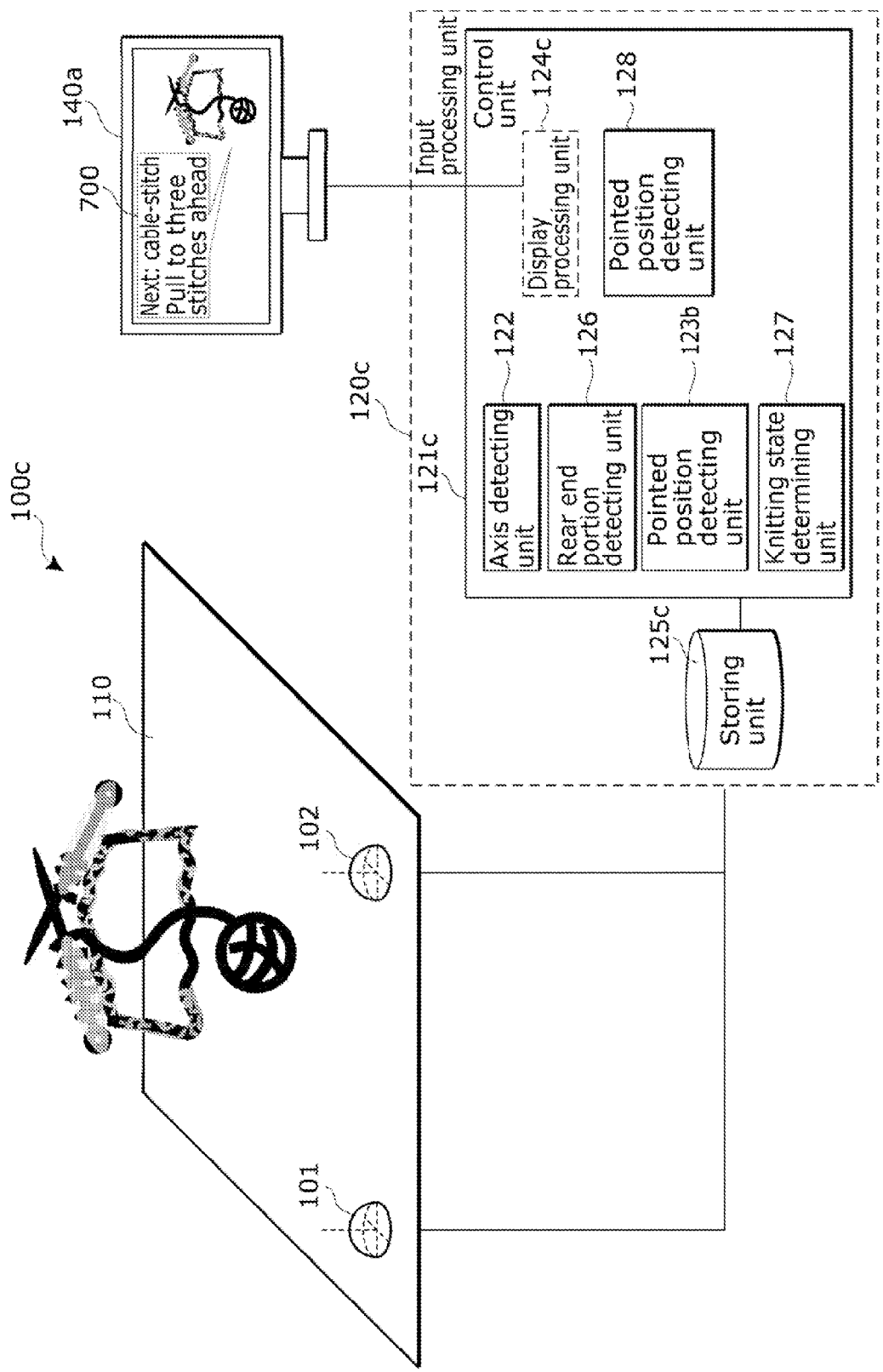
FIG. 8 illustrates a configuration of a stylus detecting device for knitting assistance according to Variation 2 of Embodiment 1.

For example, as shown in FIG. 8, it may be possible to provide a stylus detecting device 100*c* that determines a current knitting state obtained by analyzing a position and an attitude of a knitting needle serving as the stylus and a wool yarn state, and compares the current knitting state obtained as a result of the determination with knitting design information designed in advance, thereby presenting an instruction about how to knit next. FIG. 8 illustrates a configuration of the stylus detecting device 100*c* for knitting assistance according to Variation 2 of Embodiment 1.

In the stylus detecting device 100*c*, a control unit 121*c* of an input processing unit 120*c* includes a knitting state determining unit 127 and an instruction presenting unit 128, unlike the configuration of the control unit 121*b* described above. The knitting state determining unit 127 determines the current knitting state based on shape information of a yarn obtained by analyzing images captured by the first camera 101 and the second camera 102 by the cloth simulation, an estimated axis of the stylus (knitting needle) and an estimated position of a front end portion of the stylus (knitting needle). The instruction presenting unit 128 calculates an instruction 700 for instructing how to knit next by comparing the current knitting state determined by the knitting state determining unit 127 with the knitting design information designed in advance, and then the display processing unit 124*c* causes the display unit 140*a* to display the calculated instruction 700. Here, the knitting design information designed in advance is information stored in a storing unit 125*c*.

According to the stylus detecting device 100*c*, when a user does his/her knitting, the current knitting state is determined by the cloth simulation. Then, for example, if the design information indicating a completed article is set in advance, it is possible to compare the determined current knitting state with the design information, thereby presenting the next knitting procedure. Thus, merely by setting the design information of a desired knitting article in advance, the user can proceed with knitting according to the presented instruction to complete the desired knitting article even when he/she does not know how to knit next.

[Variation 3]

Figure 9:
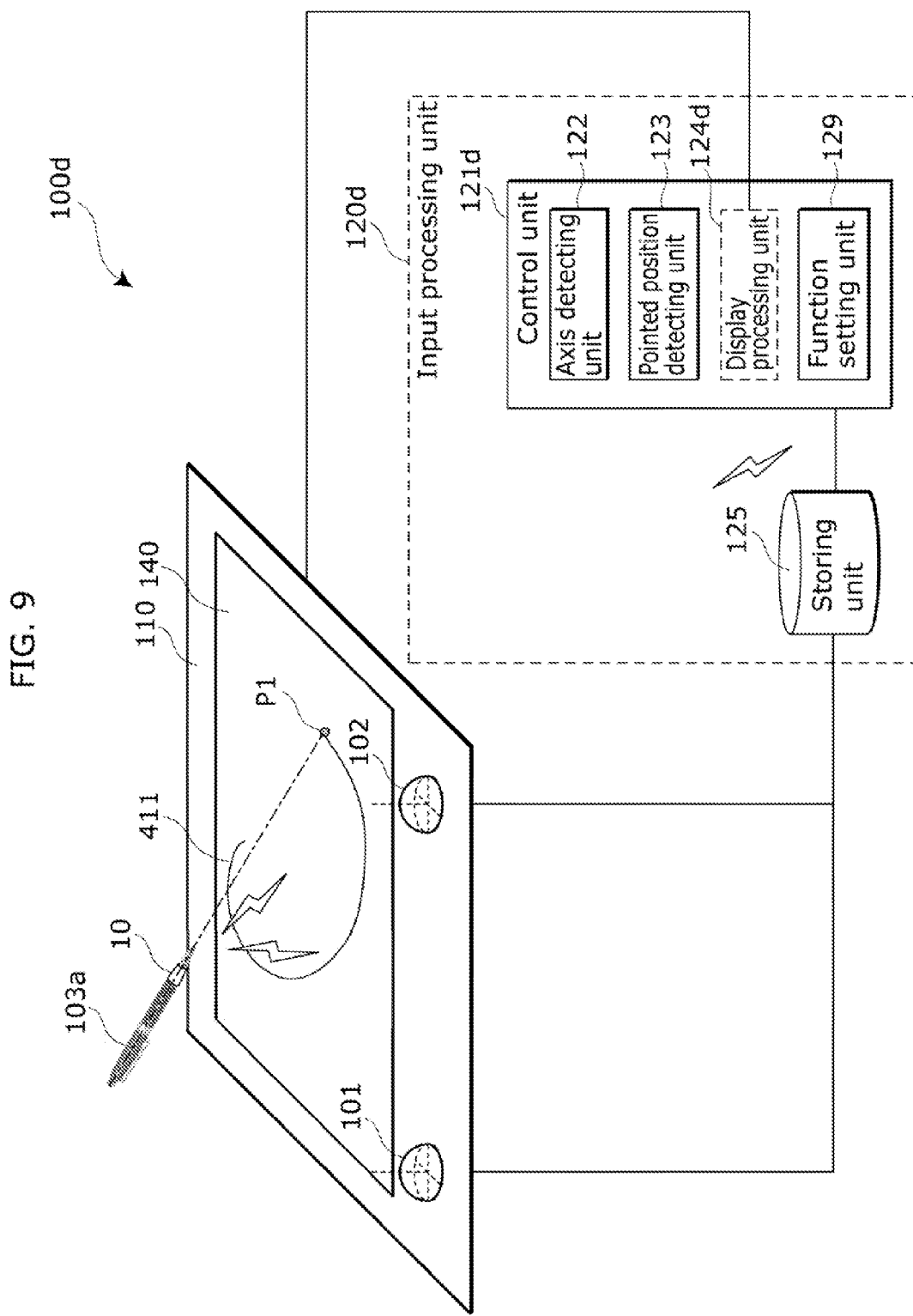
FIG. 9 illustrates a configuration of a stylus detecting device according to Variation 3 of Embodiment 1.

Although not mentioned in the stylus detecting device 100, 100*a*, 100*b* or 100*c* according to Variation 1 or 2 of Embodiment 1 described above, it may be possible to provide a stylus detecting device 100*d*, as shown in FIG. 9, that causes the display unit 140 to display a motion path 411 traveled by the pointer displayed at a predetermined position in the display unit 140 corresponding to the pointed position detected by the pointed position detecting unit 123, 123*b*. FIG. 9 illustrates a configuration of the stylus detecting device 100*d* according to Variation 3 of Embodiment 1.

Further, as shown in FIG. 9, a control unit 121*d* of an input processing unit 120*d* in the stylus detecting device 100*d* may have a function setting unit 129 that changes a drawing mode of the motion path 411 to be displayed in the display unit 140. In other words, a display processing unit 124*d* changes the drawing mode of the motion path 411 to be displayed in the display unit 140 according to a function of the setting adjusted by the function setting unit 129. The stylus detecting device 100*d* in Variation 3 includes a pressure detecting unit 10 that detects a pressure applied to the stylus 103 by a user. Then, the function setting unit 129 adjusts the setting to a first function when the pressure detecting unit 10 detects the pressure applied by the user and a second function when the pressure detecting unit 10 does not detect the applied pressure. Incidentally, the first function is a function of drawing the motion path 411 traveled by the pointer with a thick line, for example, whereas the second function is a function of drawing that motion path 411 with a thin line, for example. The drawing modes set as the first function and the second function have been described respectively as the thick line and the thin line as an example. However, the drawing modes are not limited to the thickness of the lines such as the thick line and the thin line but may be associated with, for example, display colors such as red and blue, kinds of lines such as a solid line and a dashed line, or drawing and erasing of a line such as line drawing and erasing. In other words, the function setting unit 129 adjusts the setting to one of the first function of drawing the motion path 411 of the pointed position in the first drawing mode (a thick line, a red line, a solid line, drawing, etc.) and the second function of drawing this motion path 411 in the second drawing mode (a thin line, a blue line, a dashed line, erasing, etc.) different from the first drawing mode.

The function setting unit 129 adjusts the setting to a function corresponding to each of the drawing modes according to whether a pressure is applied to the pressure detecting unit 10. However, a trigger to change the function is not limited to whether the pressure is applied to the pressure detecting unit 10. Instead, the function may be assigned according to an on/off state of a switch that is provided in the stylus 103 and can be turned on or off. In other words, in this case, the function setting unit 129 adjusts the setting to the first function when the switch is on and the second function when the switch is off.

In the above description, the two kinds of the drawing modes are set to either one of the first function and the second function according to the state of the pressure detecting unit 10 or that of the switch. However, there is no limitation to two functions, and two or more functions may be set. In this case, for example, when the pressure detecting unit 10 is used, it may not only determine the presence or absence of the pressure but also detect the magnitude of the applied pressure, whereby the functions of the setting may be adjusted by the function setting unit 129 according to which of a plurality of pressure ranges the applied pressure falls within. In other words, it may be possible to provide a configuration in which, the pressure range to be detected is predetermined as three ranges, namely, large, medium and small, a first function is set when the detected pressure falls within the range of large, a second function is set when the detected pressure falls within the range of medium, and a third function is set when the detected pressure falls within the range of small. It should be noted that these three pressure ranges need to be mutually exclusive. In the case of using the switch, it may be possible to cause the function setting unit 129 to adjust the setting to three functions by using a switch capable of indicating three or more states, for example, a dial switch. In the configuration where the pressure detecting unit 10 or the switch is provided in the stylus 103, the pressure detecting unit 10 or the switch has a communication function as described above. The state of whether the pressure is detected or the on/off state of the switch in the stylus 103 are transmitted wirelessly to the function setting unit 129.

With the stylus detecting device 100d according to Variation 3 of Embodiment 1, the motion path 411 of the pointed position is displayed in the display unit 140 according to the function of the setting adjusted by the function setting unit 129. For example, by a user's operation, the function of drawing in the first drawing mode where a black line is drawn is set as the first function, and the function of drawing in the second drawing mode where a red line is drawn is set as the second function. Thus, the user can switch these drawing modes, thereby displaying the motion path 410 of the pointed position in the display unit 140 in a user's desired drawing mode.

With the stylus detecting device 100d according to Variation 3 of Embodiment 1, the pressure detecting unit 10 capable of detecting a pressure applied by the user is provided in the stylus 103a, and the function setting unit 129 adjusts the setting to either one of the first function and the second function according to whether the pressure is applied. Further, the stylus may be provided with the switch that can be turned on or off. In this case, the user can switch the drawing modes by turning on or off the switch provided in the stylus.

In this manner, the user can switch the drawing modes by whether the pressure is applied to the stylus 103a or by turning the switch on or off. Accordingly, the user can easily switch the drawing modes to be displayed in the display unit 140 with his/her holding hand.

[Variation 4]

Although the function setting unit 129 has adjusted the setting to the functions according to whether the pressure is detected by the pressure detecting unit or the on/off state of the switch in Variation 3 described above, there is no limitation to this. For example, the function setting unit 129 may adjust the setting to the above-described functions according to an external appearance of the stylus 103 in images captured by the first camera 101 and the second camera 102. Incidentally, the relationship between the functions and the drawing modes in Variation 4 is similar to that described in Variation 3, and the description thereof will be omitted here.

More specifically, it is conceivable that, by changing a color or a pattern of the stylus 103, when such a change is detected from a captured image, the function setting unit 129 adjusts the setting to a function corresponding to that color or pattern according to the color or the pattern of the stylus 103. For example, in the case of dividing a lateral surface of the stylus 103 into two regions along an axial direction, it is conceivable to color one side of the lateral surface and the other side thereof differently. More specifically, in the case where a right half of the lateral surface of the stylus 103 is colored red and a left half thereof is colored blue, color information of the lateral surface of the stylus 103 is stored in the storing unit 125. Further, in the case of the pattern instead of the color, a polka-dot pattern, a stripe pattern, an unpatterned surface and so on are conceivable, for example. When a figure of the stylus 103 appearing in the first image 301 and the second image 302 is red, the function setting unit 129 adjusts the setting to the first function. When the figure of the stylus 103 is blue, the function setting unit 129 adjusts the setting to the second function. The above configuration allows the user to change the function settings only by changing how to hold the stylus 103 (that is, turning the stylus 103 about its axis by 180 degrees). With such a configuration, it is not necessary to incorporate the pressure detecting unit or the switch as in Variation 3 described above into the stylus 103 or incorporate the communication function into the stylus 103. In other words, any configuration using the images captured by the first camera 101 and the second camera 102 can be realized merely by providing as software the function setting unit 129 for performing the image processing.

Also, the function setting unit 129 may adjust the setting to the functions not only by changing the color of the entire stylus 103 but also by changing the color of only a part of the stylus 103. More specifically, it may be possible to set the functions by changing a color or a shape of a cap attached to the rear end portion of the stylus. In this case, the user can set the functions by, for example, replacing the colored cap.

Moreover, when changing the color of the stylus 103, it may be possible to provide a pressure detecting unit or a switch in the stylus 103 and change the color according to the detection result of the pressure detecting unit or the on/off state of the switch. For example, a plurality of LEDs with different colors are provided in a cap portion of the stylus 103. Accordingly, the stylus color can be changed by changing the color of the LEDs emitting light when the pressure detecting unit 10 detects the pressure or by changing the color of the LEDs emitting light according to the on/off state of the switch. In this case, the communication function as in Variation 3 does not have to be provided in the stylus 103.

Furthermore, the function setting unit 129 may have a configuration of adjusting the setting to a predetermined function according to the thickness of the figure of the stylus 103 appearing in the first image 301 and the second image 302. In this case, for example, it is conceivable that the function setting unit 129 adjusts the setting to the first function when the stylus 103 having a thickness larger than a predetermined threshold is detected and adjusts the setting to the second function when the stylus having a thickness equal to or smaller than the predetermined threshold is detected. For easy detection of the difference in thickness, the function setting unit 129 may be configured to adjust the setting to the first function when the stylus having a thickness larger than a first threshold is detected and adjust the setting to the second function when the stylus having a thickness smaller than a second threshold, which is smaller than the first threshold, is detected.

In this manner, the user can switch the drawing modes of the setting adjusted by the function setting unit 129 by, for example, changing the kind of the stylus, partially replacing of the stylus, changing the orientation of holding the stylus or the like.

Also, the function setting unit 129 may adjust the setting to one of the first function and the second function according to an inclination of a detected axis of the stylus. For example, it is conceivable that the function setting unit 129 adjusts the setting to the first function when the inclination of the stylus axis with respect to the target plane 110 is larger than a predetermined threshold and adjusts the setting to the second function when the inclination of the stylus axis with respect to the target plane 110 is smaller than the predetermined threshold. For easy detection, the magnitude of the inclination with reference to the threshold may be determined similarly to the way the thickness has been determined as described above. In other words, the "thickness of the stylus" mentioned above can be read as the "inclination of the stylus axis with respect to the target plane."

In this manner, the user can switch the drawing modes by changing the inclination of the stylus 103 that is being held. Accordingly, the drawing modes to be displayed in the display unit 140 can be switched easily by the user's hand movement.

Further, the function setting unit 129 may adjust the setting to the functions so that a line to be drawn becomes thinner or thicker with an increase in an angle between the detected axis of the stylus 103 and the target plane 110. In other words, instead of the configuration of setting the first function or the second function by the determination with reference to the threshold, the drawing mode may be changed steplessly according to variations of the angle of the axis of the stylus 103 with respect to the target plane 110. At this time, it is not always necessary to establish a one-to-one correspondence between the angle of the axis of the stylus 103 with respect to the target plane 110 and the thickness of the line to be drawn. Instead, the line to be drawn may become thicker or thinner as the inclination increases. Incidentally, the function setting unit 129 may have not only the configuration of changing the thickness of the line to be drawn according to the magnitude of the inclination of the axis of the stylus 103 with respect to the target plane 110 but also the configuration of changing the darkness of the line to be drawn or the configuration of changing the color of the line to be drawn (for example, the configuration of changing purple to red or a color with a short wavelength to that with a long wavelength). It should be noted that such changes may apply to the thickness of the stylus 103. Thus, the user can steplessly change the drawing modes such as the thickness of the line to be drawn by changing the inclination of the stylus 103 that is being held.

Moreover, the function setting unit 129 may have the configuration of adjusting the setting to one of the first function and the second function if the inclination of the axis of the stylus 103, the position of the pointer when a line is drawn in the display unit 140 or the displacement amount of the position of the rear end portion of the stylus 103 per unit time exceeds a predetermined threshold. More specifically, it is conceivable, for example, that the function setting unit 129 adjusts the setting to the first function if the user's gesture of shaking the stylus 103 once is detected by the detection of the above-mentioned displacement amount per unit time exceeding the predetermined threshold and then adjusts the setting to the second function if the user's gesture of shaking the stylus 103 one more time is detected. There is no limitation to the above-described configuration of changing plural kinds of functions in a preset order after each gesture. It may be possible to set the function associated with the kinds of the gesture. For example, it is conceivable that the function setting unit 129 adjusts the setting to the first function if the gesture of shaking the stylus 103 once is detected and adjusts the setting to the second function if the gesture of shaking the stylus 103 twice is detected.

With the stylus detecting device 100d in Variation 4 according to Embodiment 1, the user can switch the drawing modes to be set by the function setting unit 129 if the inclination of the axis of the stylus 103, the position of the pointer or the displacement amount of the position of the rear end portion of the stylus 103 per unit time exceeds the predetermined threshold as a result of shaking the stylus 103, for example.

[Variation 5]

Figure 10:
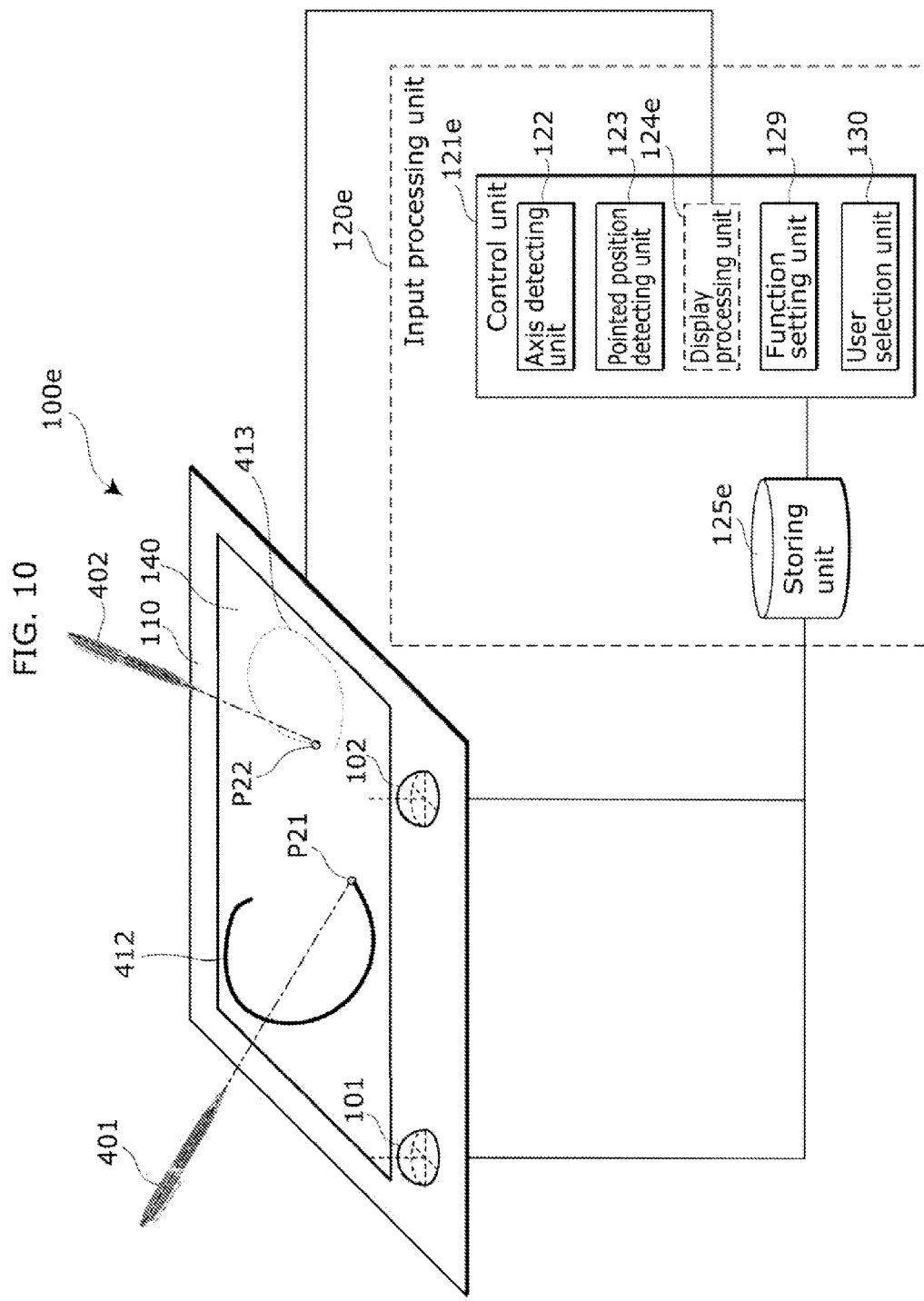
FIG. 10 illustrates a configuration of a stylus detecting device according to Variation 5 of Embodiment 1.

Although not mentioned in the stylus detecting devices 100, 100a to 100d according to Embodiment 1 or Variations 1 to 4 described above, it may be possible to provide a stylus detecting device 100e having a configuration of, when a plurality of users have their respective styli 103, 103b, causing them to draw lines in different drawing modes. For example, as in the stylus detecting device 100e shown in FIG. 10, a control unit 121e of an input processing unit 120e further has a user selection unit 130. If the user selection unit 130 detects a plurality of stylus axes, a display processing unit 124e causes the display unit 140 to display lines to be drawn in different drawing modes for individual pointed positions of the plurality of the detected styli 401 and 402. In other words, it is conceivable that, when a plurality of users hold respective styli 401 and 402 and draw lines by moving these styli 401 and 402 with respect to the target plane 110, the drawing modes are set to the individual styli 401 and 402 according to the inclination of the axes of the styli 401 and 402 and the position thereof.

For example, it is now assumed that the control unit 121e recognizes as a first stylus 401a stylus that is inclined backward behind the first camera 101 and the second camera 102 and recognizes as a second stylus 402 a stylus that is inclined frontward on a front side with respect to the first stylus 401. At this time, the control unit 121e causes a motion path 412 of a first pointed position P21 pointed to by the first stylus 401 and a motion path 413 of a second pointed position 122 pointed to by the second stylus 402 to be drawn in different drawing modes. In this case, it may be possible to set the functions so that, once the control unit 121e recognizes the first stylus 401 and the second stylus 402, it causes each of the first stylus 401 and the second stylus 402 to be followed so as to maintain the initially set drawing mode. Here, for example, the following can be a process in which a stylus in images at a subsequent frame of the images captured by the first camera 101 and the second camera 102 is considered as the same stylus as long as its movement falls within a predetermined range.

Figure 11:
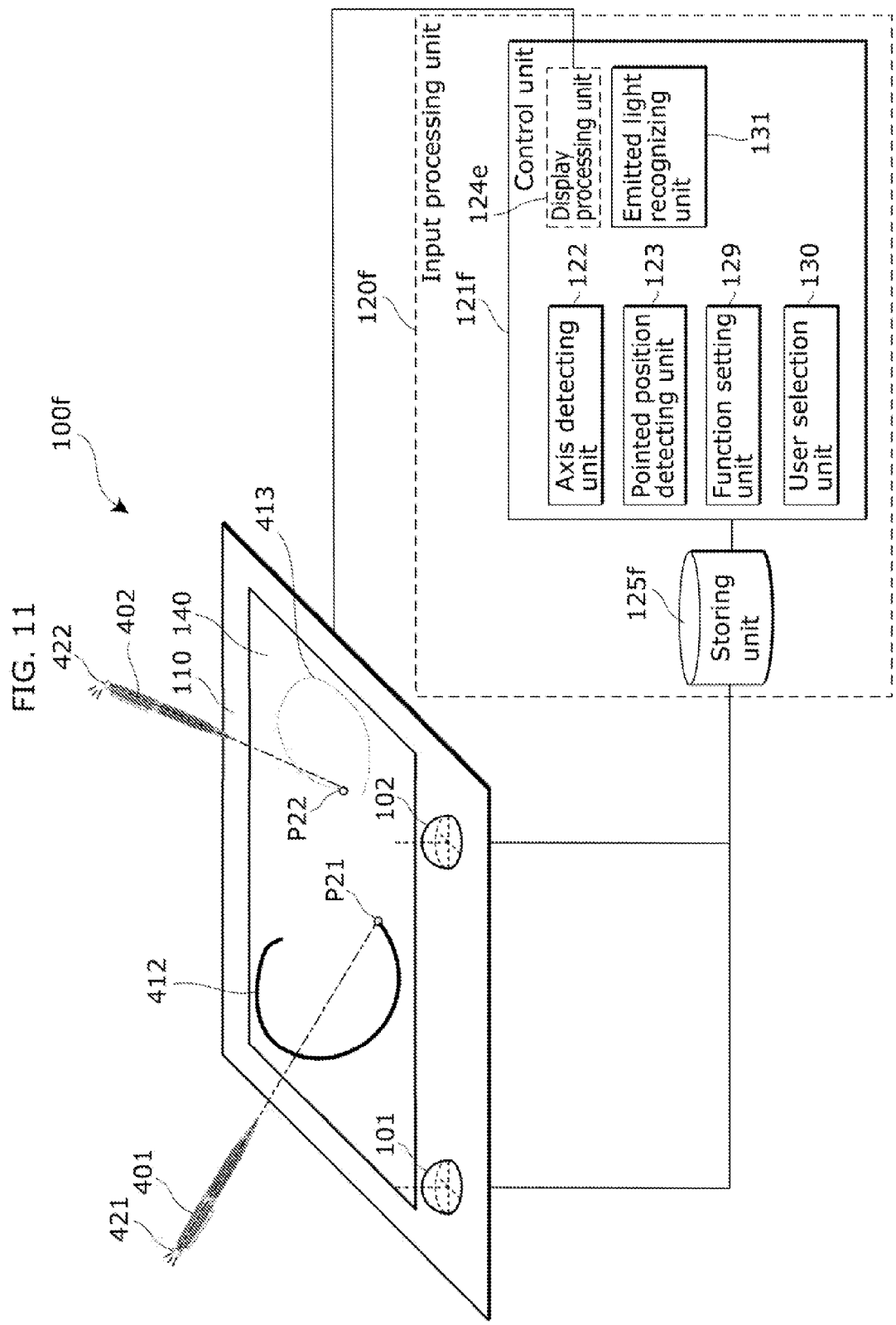
FIG. 11 illustrates a configuration of a stylus detecting device according to another aspect of Variation 5 of Embodiment 1.

Further, as in a stylus detecting device 100f shown in FIG. 11, the first stylus 401 and the second stylus 402 may be provided with a first light-emitting unit 421 and a second light-emitting unit 422 that emit light in different light-emitting patterns, and a control unit 121f may be obtained by providing the control unit 121e further with an emitted light recognizing unit 131 that distinguishes the first stylus 401 and the second stylus 402 based on figures appearing in images captured at timing of the individual light-emitting patterns. More specifically, as shown in FIG. 11, the first stylus 401 has the first light-emitting unit 421 that emits light in a first light-emitting pattern at a plurality of different first timings, and the second stylus 402 has the second light-emitting unit 422 that emits light, in a second light-emitting pattern different from the first light-emitting pattern. The emitted light recognizing unit 131 causes the first camera and the second camera to capture images at a plurality of timings including the first timing and a plurality of second timings, each of which is a light-emitting timing corresponding to the second light-emitting pattern, recognizes as the first stylus 401 the stylus with a light-emitting unit emitting light in the image captured at the first timing and recognizes as the second stylus 402 the stylus with a light-emitting unit emitting light in the image captured at the second timings. Incidentally, an input processing unit 120f having the control unit 121f in this case includes a storing unit 125f that further stores the light-emitting pattern at the first timing and the light-emitting pattern at the second timings compared with the storing unit 125e.

Figure 12:
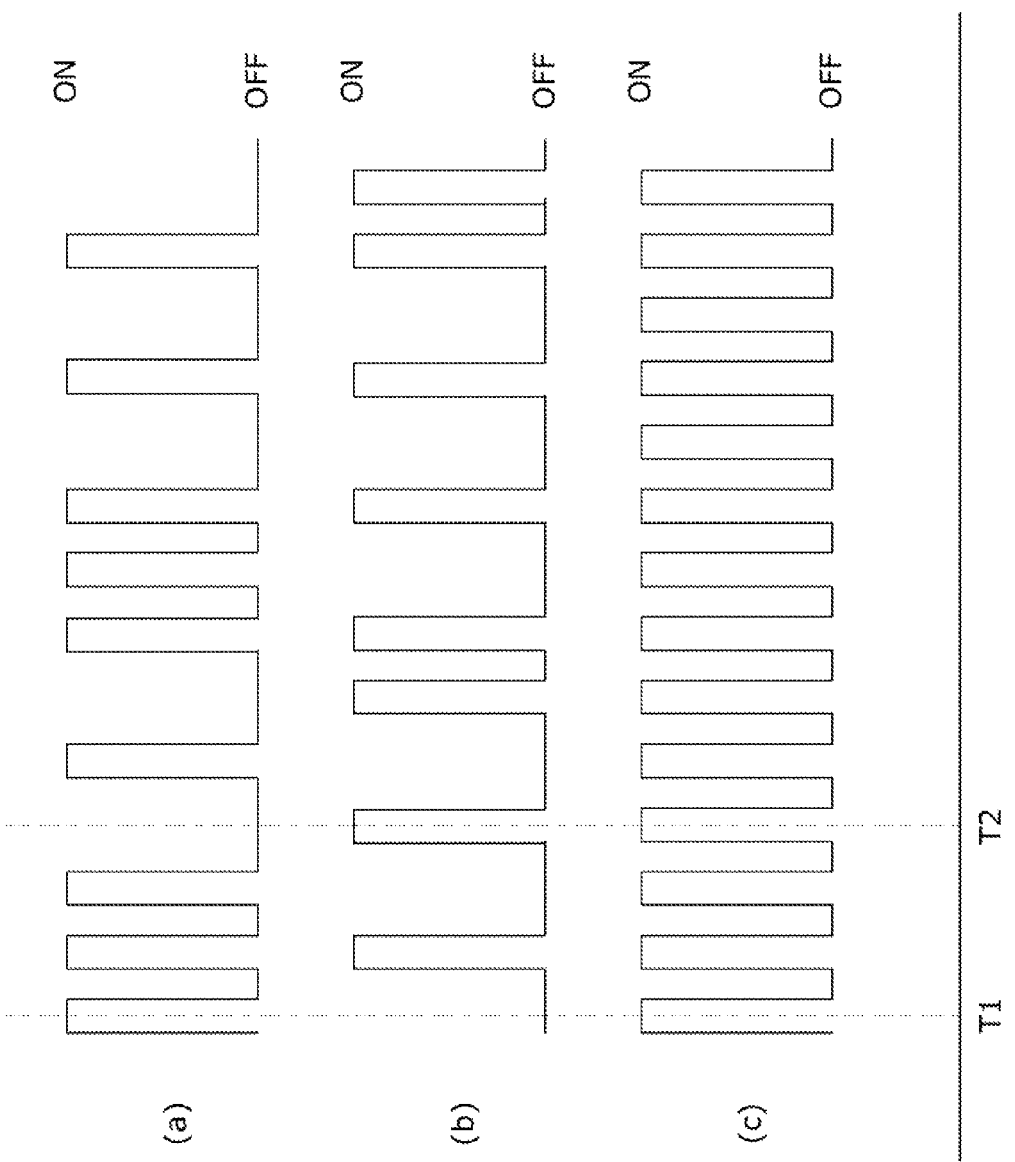
FIG. 12 shows light-emitting patterns of individual light-emitting units and timing at which individual cameras capture a plurality of frames.

FIG. 12 shows light-emitting patterns of individual light-emitting units and timing at which each camera captures a plurality of frames. More specifically, (a) in FIG. 12 illustrates the first light-emitting pattern, (b) in FIG. 12 illustrates the second light-emitting pattern, and (c) ire FIG. 12 shows the timings at which the first camera 101 and the second camera 102 capture the frames. As shown in FIG. 12, at timing T1, since the first light-emitting unit emits light in the first light-emitting pattern, the brightness value in a region of the first light-emitting unit on the first and second images exceeds a predetermined value. On the other hand, since the second light-emitting unit does not emit light in the second light-emitting pattern at timing T1, the brightness value in a region of the second light-emitting unit on the first and second images does not exceed the predetermined value. Conversely, at timing T2, since the second light-emitting unit emits light in the second light-emitting pattern, the brightness value in the region of the second light-emitting unit on the first and second images exceeds the predetermined value. On the other hand, since the first light-emitting unit does not emit light in the first light-emitting pattern at timing T2, the brightness value in the region of the first light-emitting unit on the first and second images does not exceed the predetermined value. In other words, by analyzing the first image or the second image at timing T1 or timing T2, it is possible to distinguish the first stylus 401 and the second stylus 402.

With the stylus detecting devices 100e and 100f in Variation 5 of Embodiment 1 described above, even when a plurality of users use their respective styli 401 and 402 for input, they can draw lines in the drawing modes associated with the individual users. This allows the users to easily distinguish which user has drawn what.

Embodiment 2

Figure 13:
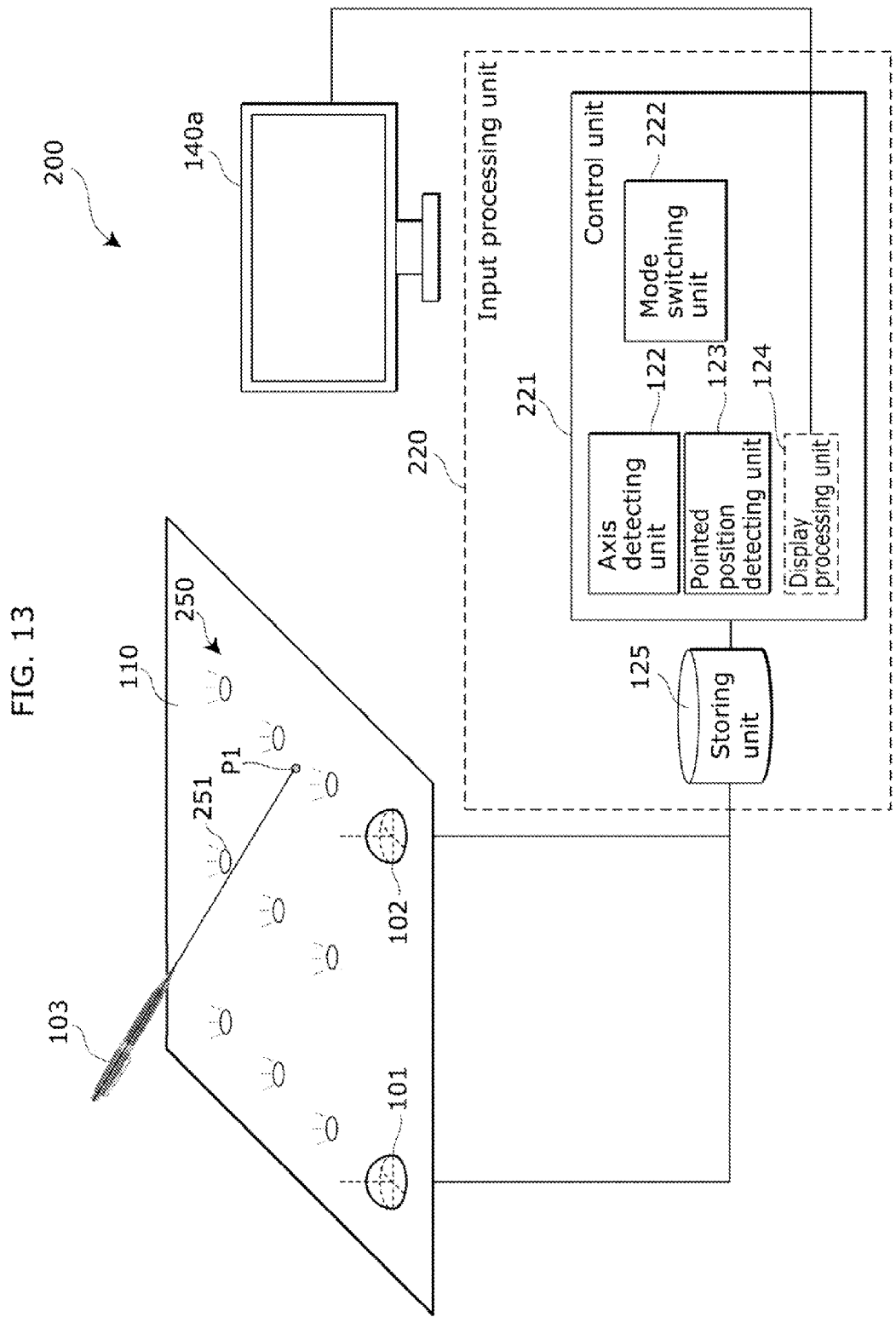
FIG. 13 illustrates a configuration of a stylus detecting device according to Embodiment 2.

Although not mentioned in Embodiment 1 above, it may be possible to provide a stylus detecting device 200 having a configuration as shown in FIG. 13 in which a detection accuracy of the stylus 103 is enhanced by causing the stylus to emit infrared radiation. The following description will be directed only to the configuration different from that of the stylus detecting device 100 discussed in Embodiment 1. The stylus detecting device 200 further includes an irradiation unit 250. The irradiation unit 250 irradiates, with infrared radiation, a target, space whose image is to be captured by the first camera 101 and the second camera 102. The display unit 140a outwardly emits light with a frequency band different from a frequency band of the infrared radiation emitted by the irradiation unit 250. At this time, the display unit 140a may have a configuration in which light emitted from the light-emitting unit of the display unit 140a is set to have a different frequency band from the infrared radiation or a configuration in which a display surface of the display unit 140a is provided with a band-pass filter that does not pass infrared wavelengths outward.

In this configuration, the frequency band of the infrared radiation emitted from the irradiation unit 250 and the frequency band of the light emitted from the display unit 140a are different. Thus, for example, with external light such as solar light being blocked, a figure appearing in a region where the infrared frequency band is detected in the images captured by the first camera 101 and the second camera 102 is considered as a figure attributed to the infrared radiation emitted from the irradiation unit 250. In other words, even when an image of at least a figure attributed to the light emitted from the display unit or a figure of the display unit 140a itself is captured, the figure attributed to the light emitted from the display unit 140a can be ignored. Thus, since the figure appearing in the region where the infrared frequency band is detected in the images captured by the first camera 101 and the second camera 102 is not the figure attributed to the light emitted from the display unit 140a, it is possible to reduce a detection error of the stylus 103. Also, for example, by utilizing an infrared reflecting material as the material for the stylus, the accuracy of stylus detection can be raised further. Additionally, for example, by forming a member other than the stylus such as the display unit with an infrared absorbing material, the accuracy of stylus detection can be enhanced further.

Figure 14:
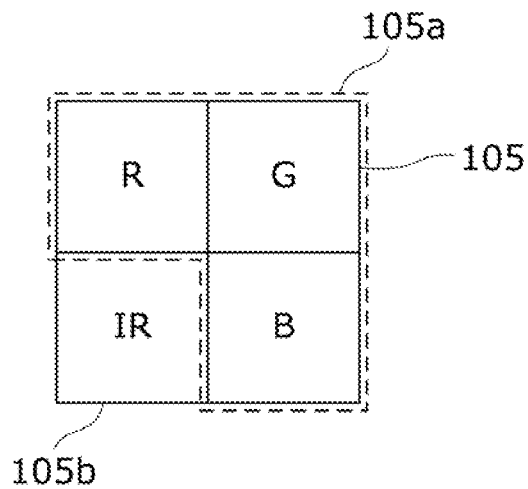
FIG. 14 illustrates a configuration of one pixel, which is a minimum unit of an imaging device.

Moreover, as shown in FIG. 14, a configuration in which an imaging device 105 constituting the first camera 101 and the second camera 102 includes an RGB (red-green-blue) sensor 105a for detecting RGB and an IR (infrared) sensor 105b for detecting infrared radiation can raise the detection accuracy of the stylus 103. FIG. 14 illustrates the configuration of one pixel, which is a minimum unit of the imaging device 105. In this configuration, a control unit 221 of an input processing unit 220 further includes a mode switching unit 222 that switches the sensors to be used for image capturing by the first camera 101 and the second camera 102 according to the intensity of external light in an environment where the first camera 101 and the second camera 102 are placed.

The mode switching unit 222 switches to a first mode if the intensity of external light in the above-mentioned environment is smaller than a predetermined threshold and to a second mode if the intensity of external light in that environment is larger than the predetermined threshold. Here, the first mode refers to a mode in which, when the first camera 101 and the second camera 102 capture n frames per second (n is a natural number), the IR sensor 105b performs IR detection while the irradiation unit 250 is emitting infrared radiation, and during this IR detection, the RGB sensor 105a performs RGB detection at timing of at least 1/n frame. The second mode refers to a mode in which the RGB detection is performed and, during this RGB detection, the irradiation unit 250 emits infrared radiation and the IR detection is performed at timing of at least 1/n frame.

In other words, the mode switching unit 222 thus switches to the first mode in the case of a so-called dark environment where the intensity of external light, for example, solar light is smaller than the predetermined threshold. Conversely, the mode switching unit 222 switches to the second mode in the case of a so-called bright environment where the intensity of external light is larger than the predetermined threshold. In other words, in the dark environment, while the IR detection is being performed, the RGB detection is performed simultaneously at timing of 1/n frame. In the bright environment, while the RGB detection is being performed, the IR detection is performed at timing of 1/n frame.

In the case of the dark environment where the RGB detection is difficult, by adopting the first mode for mainly performing the IR detection, which allows easy detection even in the dark environment, it becomes possible to enhance the detection accuracy of the stylus 103. In this case, a color of the stylus 103 can be detected by performing the RGB detection for 1/n frame, thereby raising the detection accuracy of the stylus 103.

On the other hand, in the case of the bright environment where the RGB detection is easy, by adopting the second mode for mainly performing the RGB detection, it becomes possible to enhance the detection accuracy of the stylus 103. In this case, even when a color surrounding the stylus 103 is similar to that of the stylus 103 at the time of the RGB detection the IR detection for only 1/n frame can distinguish the stylus 103 and its surrounding area, thus further raising the detection accuracy of the stylus 103. Moreover, in the second mode, since the power-consuming irradiation by the irradiation unit 250 only has to be performed at the timing of 1/n frame of the IR detection, it is possible to reduce the power consumption.

Additionally, the control unit 221 may synchronize timing of the irradiation for the IR detection by the irradiation unit 250 and timing of image capturing by the first camera 101 and the second camera 102. In this way, when the first camera 101 and the second camera 102 capture images in an environment where, for example, external light is blocked and when the light emitted from the display unit has a frequency band different from an infrared frequency band, it is possible to prevent a third party, who attempts to recognize the stylus 103 using a camera different from the first camera 101 or the second camera 102, from detecting the position of the stylus. This prevents personal information such as an inputted user's sign from being stolen, for example.

Incidentally, the configuration of Embodiment 2 is not limited to that of recognizing the stylus with a stereo camera. The configuration can be utilized for enhancing the detection accuracy as long as it is for detecting a specific object such as the stylus from an image captured by a camera.

Embodiment 3

Although not mentioned in Embodiment 1 or 2 above, it may be possible to provide a stylus detecting device 300 including an input processing unit 320 having an irradiation control unit 322 for controlling an amount of light emitted from the irradiation unit 250 so as to improve an energy efficiency for the irradiation by the irradiation unit 250 when the irradiation unit 250 including a plurality of light sources, for example, a plurality of LEDs 251 as shown in FIG. 15 is used to irradiate the stylus with infrared radiation. The following description will be directed only to the configuration different from that of the stylus detecting device 100 discussed in Embodiment 1.

The stylus detecting device 300 includes the irradiation unit 250 including the plurality of light sources that irradiate, with infrared radiation, a target space whose image is to be captured by the first camera 101 and the second camera 102. The irradiation unit 250 is formed by, for example, arranging a plurality of (9 in Embodiment 3) LED light sources 251 in a matrix on the target plane 110. The irradiation unit 250 may have a configuration in which the plurality of LED light sources 251 are arranged along a line instead of in a matrix on the target plane 110. In other words, there is no limitation to the arrangement of the LED light sources 251 as long as they are arranged so as to irradiate the target space evenly.

When a first light source denotes an LED light source that irradiates the position of the stylus detected by the axis detecting unit 122 among the plurality of LED light sources 251, the irradiation control unit 322 makes the amount of light from LED light sources 251 other than the first light source lower than the amount of light from the first light source. More specifically, as shown in FIG. 16, the irradiation control unit 322 reads out arrangement information indicating a predetermined arrangement of each of the plurality of LED light sources 251 from the storing unit 125, and sets as the first light source the LED light source that is closest to a position corresponding to the stylus position detected by an image analysis of the first image 301 and the second image 302 carried out by the axis detecting unit 122. Here, (a) and (b) in FIG. 16 are presented for describing a process of changing the amount of light from the LED light sources with the movement of the stylus. The number of the LED light sources to be set as the first light source is not limited to one but may be any number of the LED light sources located within a predetermined range from the detected position of the stylus. More than one LED light sources may be set as the first light source.

In the stylus detecting device 300 of Embodiment 3 described above, the irradiation control unit 322 makes the amount of light from the light source irradiating a periphery of the position of the detected stylus 103 lower than the amount of light from the first light source. In this manner, since the irradiation control unit 322 reduces the amount of light from the light sources substantially unnecessary for the detection of the stylus 103, it is possible to minimize a decrease in the detection accuracy of the stylus 103 and reduce power consumption.

Further, as in a stylus detecting device 300a shown in FIG. 17, a control unit 321a of the input processing unit 320 may further include an image capturing control unit 323 that dynamically changes a frame rate for image capturing by the first camera 101 and the second camera 102 in an appropriate manner. This configuration achieves further energy saving. The image capturing control unit 323 reduces the frame rate for image capturing by the first camera 101 and the second camera 102 if a movement amount of the stylus 103 detected by the axis detecting unit 122 per unit time is equal to or smaller than a predetermined threshold, and raises the above-noted frame rate if the movement amount per unit time exceeds that threshold. Here, the movement amount per unit time is calculated from the position of the stylus 103 per frame detected by the axis detecting unit 122.

In this manner, the image capturing control unit 323 raises and reduces the frame rate for image capturing by the first camera 101 and the second camera 102 according to the increase and decrease in a moving speed of the stylus 103. Thus, it becomes possible to reduce the power consumption while minimizing a decrease in the detection accuracy of the stylus 103.

It should be noted that the frame rate of the first camera 101 and that of the second camera 102 may be made different. For example, there is a time when small changes occur in the position and attitude of the stylus 103 whose image is captured from a direction of the first camera 101 and large changes occur in the position and attitude of the stylus 103 whose image is captured from a direction of the second camera 102. This is the case were the stylus 103 is moving in the direction of the first camera 101. In such a case, only the frame rate of the first camera 101 is reduced, and the frame rate of the second camera 102 is left as it stands. At this time, the timing of image capturing by the first camera 101 and that by the second camera 102 are not matched and need not be matched. In other words, since the position of the stylus appearing in the image captured by the second camera 102 changes greatly, the number of images captured per unit time has to be large in order to accurately detect that stylus position. On the other hand, since the position of the stylus appearing in the image captured by the first camera 101 does not change substantially, it may be possible to adopt the image captured at the earliest timing, for example.

It should be noted that, in each of the embodiments described above, each structural component may be constituted by dedicated hardware or be realized by executing a software program suitable for each structural component. Each structural component may be realized by a program execution unit such as a CPU or a processor reading out and executing a software program stored in a hard disk or a recording medium such as a semiconductor memory. Here, the software that realizes the stylus detecting device, etc. in each of the embodiments described above is a program as below.

Also, this program may cause a computer to execute a stylus detecting method for detecting a pointed position which is a position pointed to by a stylus, the method including obtaining at least a pair of images captured at matched timings by a first camera and a second camera that is located at a position different from a position of the first camera and captures an image of at least a part of a capture target of the first camera; detecting an axis of the stylus at the timings by using the at least a pair of images obtained in the obtaining; and calculating as the pointed position a point of intersection between a straight line coinciding with the axis of the stylus detected in the detecting and a plane having a predetermined positional relationship with respect to the first camera and the second camera.

Incidentally, the configuration of Embodiment 3 is not limited to that of recognizing the stylus with a stereo camera. The configuration can be utilized for reducing the power consumption as long as it is of detecting a specific object such as the stylus from an image captured by a camera.

It is noted that individual functional blocks in the block diagram (such as FIG. 2) are typically achieved in the form of LSIs, which are integrated circuits. They may be individually made into a single chip or may be partially or entirely made into a single chip (for example, the functional blocks other than a memory may be made into a single chip).

Although the LSI is mentioned above, it may be also referred to as an IC, a system LSI, a super LSI or an ultra LSI depending on the degree of integration.

Furthermore, ways to achieve circuit integration are not limited to the LSI, and a dedicated circuit or a general purpose processor can also achieve the integration. It may be possible to utilize an FPGA (Field Programmable Gate Array) that can be programmed after manufacturing LSIs or a reconfigurable processor that allows reconfiguration of the connection and settings of circuit cells inside the LSI.

In the future, with the advancement of a semiconductor technology or another technology deriving therefrom, a new circuit integration technology may replace the LSI. Such a technology may of course integrate the functional blocks. Application of biotechnology is one such possibility.

Also, among the individual functional blocks, only the means for storing data to be encoded or decoded may be provided as a separate structure without being made into a single chip.

Although the stylus detecting devices according to one or more aspects of the present invention have been described above based on the embodiments, the present invention is not limited to these embodiments. As long as not departing from the purport of the present invention, many variations of the above embodiments conceivable by a person skilled in the art and modes configured by the combination of the structural components in different embodiments may be included in the scope of one or more aspects of the present invention.

INDUSTRIAL APPLICABILITY

The present invention is useful as a stylus detecting device, etc. that can detect a position pointed to by a stylus regardless of a position held by a user, thus detecting the pointed position accurately.

REFERENCE SIGNS LIST

10 Pressure detecting unit
100, 100a, 100b, 100c, 100d, 100e, 100f, 200, 300, 300a Stylus detecting device
101 First camera
102 Second camera
103, 103a, 103b Stylus
105 Imaging device
105a RGB sensor
105b IR sensor
110 Target plane
120, 120b, 120c, 120d, 120e, 120f, 220, 320 Input processing unit 121, 121b, 121c, 121d, 121e, 121f, 221, 321, 321a Control unit
122 Axis detecting unit
123, 123b Pointed position detecting unit
124, 124b, 124c, 124d, 124e Display processing unit 125, 125b, 125c, 125e, 125f Storing unit
126 Rear end portion detecting unit
127 Knitting state determining unit
128 Instruction presenting unit
129 Function setting unit
130 User selection unit
131 Emitted light recognizing unit
140, 140a Display unit
201 First plane
202 Second plane
210 Straight line
211 First axis
212 Second axis
221 Control unit
222 Mode switching unit
250 Irradiation unit
251 Light source
301 First image
302 Second image
322 Irradiation control unit
323 Image capturing control unit
401 First stylus
402 Second stylus
410, 411, 412, 413 Motion path
421 First light-emitting unit
422 Second light-emitting unit
700 Instruction

The invention claimed is:

1. A stylus detecting device that detects a pointed position which is a position pointed to by a stylus, the device comprising:
a first camera;
a second camera that is located at a position different from a position of the first camera and captures an image of at least a part of a capture target of the first camera;
a display unit; and
a control unit that includes (i) an axis detecting unit configured to detect a three-dimensional position and attitude of an axis of the stylus by using two images captured respectively by the first camera and the second camera, (ii) a pointed position detecting unit configured to calculate as the pointed position a point of intersection between a straight line indicated by the axis of the stylus whose three-dimensional position and attitude have been detected by the axis detecting unit and a target plane having a predetermined positional relationship with respect to the first camera and the second camera, (iii) a display processing unit configured to display in the display unit a motion path traveled by a pointer displayed at a predetermined position in the display unit corresponding to the pointed position calculated by the pointed position detecting unit, and (iv) a function setting unit configured to adjust a setting to one of a first function of drawing a motion path of the pointed position in a first drawing mode and a second function of drawing the motion path in a second drawing mode different from the first drawing mode,
wherein the display processing unit is configured to display the motion path according to the one of the first function and the second function of the setting adjusted by the function setting unit.

2. The stylus detecting device according to claim 1, wherein the axis detecting unit is configured to
calculate a first axis, which is the axis of the stylus on a first image captured by the first camera, and a second axis, which is the axis of the stylus on a second image captured by the second camera,
calculate a first plane through which the calculated first axis and the position of the first camera pass and a second plane through which the calculated second axis and the position of the second camera pass, and
detect as the three-dimensional position and attitude of the axis of the stylus a line of intersection between the first plane and the second plane that are calculated.

3. The stylus detecting device according to claim 1, wherein the display processing unit is configured to display the pointer at the predetermined position in the display unit corresponding to the pointed position calculated by the pointed position detecting unit.

4. The stylus detecting device according to claim 3, wherein the target plane is a display surface of the display unit, and
the display processing unit is configured to display the pointer in the display unit to match the pointer with the pointed position.

5. The stylus detecting device according to claim 1, wherein the target plane is a physical surface different from a display surface of the display unit.

6. The stylus detecting device according to claim 1, wherein the target plane is a virtual plane.

7. The stylus detecting device according to claim 1, further comprising
a pressure detecting unit provided in the stylus and configured to detect a pressure applied to the stylus by a user,
wherein the function setting unit is configured to adjust the setting to the first function when the pressure detecting unit detects the applied pressure and the second function when the pressure detecting unit does not detect the applied pressure.

8. The stylus detecting device according to claim 1, further comprising
a switch that is provided in the stylus and can be turned on or off,
wherein the function setting unit is configured to adjust the setting to the first function when the switch is on and the second function when the switch is off.

9. The stylus detecting device according to claim 1, wherein the function setting unit is configured to adjust the setting to one of the first function and the second function according to an external appearance of the stylus in an image captured by the first camera or the second camera.

10. The stylus detecting device according to claim 1, wherein the function setting unit is configured to adjust the setting to one of the first function and the second function according to an inclination of the detected axis of the stylus.

11. The stylus detecting device according to claim 1, wherein the function setting unit is configured to adjust the setting to a function of drawing a line to be thinner or thicker with an increase in an angle between the detected axis of the stylus and the target plane.

12. The stylus detecting device according to claim 1, wherein the function setting unit is configured to adjust the setting to one of the first function and the second function if an inclination of the axis of the stylus, the position of the pointer or a displacement amount of the position of the rear end portion of the stylus per unit time exceeds a predetermined threshold.

13. The stylus detecting device according to claim 1, wherein the control unit further includes a user selection unit configured to, if a plurality of axes of the stylus are detected, cause lines to be drawn in different drawing modes for individual pointed positions of the plurality of the detected styli.

14. The stylus detecting device according to claim 1, wherein the display unit is configured to display drawing by a displaying process,
the stylus detecting device further comprises an irradiation unit configured to irradiate with infrared radiation a target space whose image is captured by the first camera and the second camera, and
the display unit is configured to emit light in a frequency band different from a frequency band of the infrared radiation emitted from the irradiation unit.

15. The stylus detecting device according to claim 1, further comprising
an irradiation unit configured to irradiate with infrared radiation a target space whose image is to be captured by the first camera and the second camera,
wherein an imaging device of the first camera or the second camera includes an RGB (red-green-blue) sensor for detecting RGB and an IR (infrared) sensor for detecting infrared radiation,
the control unit further includes a mode switching unit configured to switch between a first mode and a second mode, the first mode being a mode in which, when the first camera and the second camera capture n frames per second, the IR sensor performs IR detection while the irradiation unit is emitting infrared radiation, and during the IR detection, the RGB sensor performs RGB detection at timing of at least 1/n frame, and the second mode being a mode in which the RGB detection is performed and, during the RGB detection, the irradiation unit emits infrared radiation and the IR detection is performed at timing of at least 1/n frame, where n is a natural number, and the mode switching unit is configured to switch to the first mode if intensity of external light in an environment where the first camera or the second camera is located is smaller than a predetermined threshold and to the second mode if the intensity of external light in the environment is larger than the predetermined threshold.

16. The stylus detecting device according to claim 1, further comprising an irradiation unit including a plurality of light sources that irradiate with infrared radiation a target space whose image is captured by the first camera and the second camera, wherein the control unit further includes an irradiation control unit configured to, when a first light source denotes a light source that irradiates the detected position of the stylus among the plurality of light sources, make an amount of light from light sources other than the first light source lower than an amount of light from the first light source.

17. The stylus detecting device according to claim 1, wherein the control unit further includes an image capturing control unit configured to reduce a frame rate for image capturing by the first camera and the second camera if a movement amount of the detected stylus per unit time is equal to or smaller than a predetermined threshold, and to raise the frame rate if the movement amount per unit time exceeds the threshold.

18. The stylus detecting device according to claim 1, further comprising a first stylus including a first light-emitting unit configured to emit light in a first light-emitting pattern at a plurality of different first timings, and a second stylus including a second light-emitting unit configured to emit light in a second light-emitting pattern different from the first light-emitting pattern, wherein the control unit further includes an emitted light recognizing unit configured to cause the first camera and the second camera to capture images at a plurality of timings including the first timings and a plurality of second timings, each of which is a light-emitting timing corresponding to the second light-emitting pattern, to recognize as the first stylus the stylus with a light-emitting unit emitting light in the image captured at the first timings, and to recognize as the second stylus the stylus with a light-emitting unit emitting light in the image captured at the second timings.

19. A stylus detecting method for detecting a pointed position which is a position pointed to by a stylus, the method comprising:

obtaining at least a pair of images captured at matched timings by a first camera and a second camera that is located at a position different from a position of the first camera and captures an image of at least a part of a capture target of the first camera;

detecting an axis of the stylus at the timings by using the at least a pair of images obtained in the obtaining; and calculating as the pointed position a point of intersection between a straight line coinciding with the axis of the stylus detected in the detecting and a plane having a predetermined positional relationship with respect to the first camera and the second camera;

adjusting a setting to one of a first function of drawing a motion path of the pointed position in a first drawing mode and a second function of drawing the motion path in a second drawing mode different from the first drawing mode; and displaying in a display unit a motion path traveled by a pointer displayed at a predetermined position in the display unit corresponding to the pointed position calculated in the calculating, according to the one of the first function and the second function of the setting adjusted in the adjusting.

20. A non-transitory computer-readable recording medium storing a program for causing a computer to execute the stylus detecting method according to claim 19.

21. An integrated circuit constituting a stylus detecting device that detects a pointed position which is a position pointed to by a stylus, the integrated circuit comprising:

a first camera;

a second camera that is located at a position different from a position of the first camera and captures an image of at least a part of a capture target of the first camera;

a display unit; and a control unit that includes (i) an axis detecting unit configured to detect a three-dimensional position and attitude of an axis of the stylus by using two images captured respectively by the first camera and the second camera, (ii) a pointed position detecting unit configured to calculate as the pointed position a point of intersection between a straight line indicated by the axis of the stylus whose three-dimensional position and attitude have been detected by the axis detecting unit and a target plane having a predetermined positional relationship with respect to the first camera and the second camera, (iii) a display processing unit configured to display in the display unit a motion path traveled by a pointer displayed at a predetermined position in the display unit corresponding to the pointed position calculated by the pointed position detecting unit, and (iv) a function setting unit configured to adjust a setting to one of a first function of drawing a motion path of the pointed position in a first drawing mode and a second function of drawing the motion path in a second drawing mode different from the first drawing mode, wherein the display processing unit is configured to display the motion path according to the one of the first function and the second function of the setting adjusted by the function setting unit.

* * * * *